(12) United States Patent
Wong et al.

(10) Patent No.: US 11,386,328 B2
(45) Date of Patent: *Jul. 12, 2022

(54) METHOD, APPARATUS AND COMPUTER PROGRAM FOR GENERATING ROBUST AUTOMATED LEARNING SYSTEMS AND TESTING TRAINED AUTOMATED LEARNING SYSTEMS

(71) Applicants: Robert Bosch GmbH, Stuttgart (DE); Carnegie Mellon University, Pittsburgh, PA (US)

(72) Inventors: Eric Wong, Lexington, MA (US); Frank Schmidt, Stuttgart (DE); Jan Hendrick Metzen, Boeblingen (DE); Jeremy Zico Kolter, Pittsburgh, PA (US)

(73) Assignees: Robert Bosch GmbH, Stuttgart (DE); Carnegie Mellon University, Pittsburgh, PA (US)

( * ) Notice: Subject to any disclaimer, the term of this patent is extended or adjusted under 35 U.S.C. 154(b) by 769 days.

This patent is subject to a terminal disclaimer.

(21) Appl. No.: 16/173,698

(22) Filed: Oct. 29, 2018

(65) Prior Publication Data

US 2019/0370660 A1    Dec. 5, 2019

Related U.S. Application Data

(60) Provisional application No. 62/677,896, filed on May 30, 2018, provisional application No. 62/736,858, filed on Sep. 26, 2018.

(51) Int. Cl.
*G06N 3/08* (2006.01)
*G06N 3/04* (2006.01)
*G06F 17/17* (2006.01)

(52) U.S. Cl.
CPC ............. *G06N 3/084* (2013.01); *G06F 17/17* (2013.01); *G06N 3/0454* (2013.01); *G06N 3/0481* (2013.01); *G06N 3/08* (2013.01); *G06N 3/088* (2013.01)

(58) Field of Classification Search
CPC .......... G06N 3/08; G06N 3/084; G06N 3/088; G06N 3/0454; G06N 3/0481; G06F 17/17
See application file for complete search history.

(56) References Cited

U.S. PATENT DOCUMENTS

| 4,884,216 A | * | 11/1989 | Kuperstein | ............... B25J 9/161 700/259 |
| 2018/0260793 A1 | * | 9/2018 | Li | ........................... G06T 7/001 |
| 2019/0294949 A1 | * | 9/2019 | Harvey | ................ G06K 9/6267 |
| 2021/0027094 A1 | * | 1/2021 | Feng | .................... G06K 9/6256 |

OTHER PUBLICATIONS

Hayes et al. "Learning Universal Adversarial Perturbations with Generative Models", IEEE Security and Privacy Workshops, May 24, 2018, pp. 43-49.*
Eric Wong et al: "Provable defenses against adversarial examples via the convex outer adversarial polytope", arxiv.org, Cornell University, Ithaca, NY 14853, Nov. 2, 2017, arXiv:1711.00851v1.

* cited by examiner

*Primary Examiner* — Li Wu Chang
(74) *Attorney, Agent, or Firm* — Maginot, Moore & Beck LLP

(57) ABSTRACT

In a method for training a first neural network a superposed classification is back-propagated through a second neural network. An output value of the second neural network is utilized to determine whether the input of the first neural network is adversarial.

26 Claims, 19 Drawing Sheets

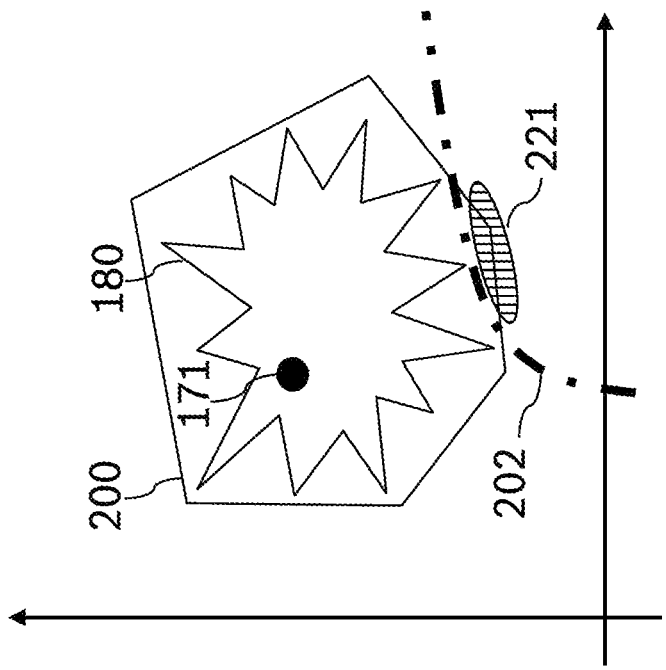
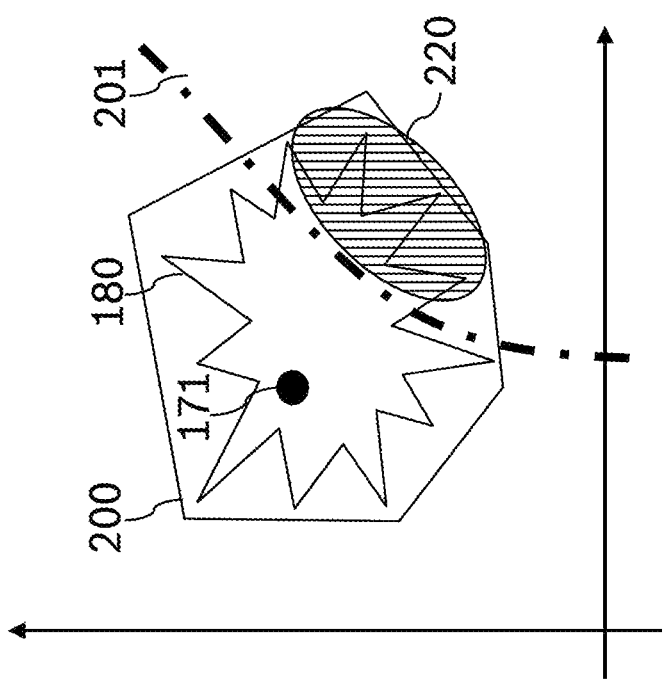
Fig. 2

METHOD, APPARATUS AND COMPUTER PROGRAM FOR GENERATING ROBUST AUTOMATED LEARNING SYSTEMS AND TESTING TRAINED AUTOMATED LEARNING SYSTEMS

This application claims the benefit of priority of U.S. provisional application Ser. No. 62/677,896 filed on May 30, 2018 and U.S. provisional application Ser. No. 62/736,858 filed on Sep. 26, 2018 the disclosures of which are herein incorporated by reference in their entirety.

The disclosure pertains inter alia to a method to generate automated learning systems with guaranteed robustness against adversarial modifications of the input. The disclosure further pertains to an apparatus as well as a computer program, which are configured to carry out the method.

BACKGROUND

The not pre-published German patent application DE 10 2018 200 724 discloses a method for determining universal adversarial perturbations for automated learning systems. The universal adversarial perturbation is determined dependent on several training images and corresponding target semantic segmentations. The universal adversarial perturbation is configured to fool a neural network when it is superposed on arbitrary input images of the neural network.

The not pre-published German patent application DE 10 2018 208 763 discloses a method for training a neural network in order to achieve a robustness of the trained neural network against adversarial perturbations. The method comprises the steps of training the neural network, determining the universal adversarial perturbation and retraining the neural network dependent on the universal adversarial perturbation.

It is possible to let a person disappear in an image due to an adversarial modification of the image that is not visible for the human eye, as shown by Metzen, et al. "Universal adversarial perturbations against semantic image segmentation." in: *The IEEE International Conference on Computer Vision (ICCV)* 2017.

SUMMARY

Nowadays, autonomous driving can be based on cameras, which sense the environment of an autonomous car. Intelligent image processing comprising neural networks processes images of such a camera in order to control the autonomous car dependent on the sensed images. However, it is possible that the intelligent image processing, in particular the neural networks, is fooled by a perturbed image. The perturbation can be an adversarial modification of the image such as described above in the prior art section. The perturbation image can fool the neural network although the modified image does not differ from the originally depicted scene for the human eye. Therefore, neural networks are highly vulnerable to adversarial attacks. A possible defense is to retrain neural network with additionally generated adversarial modifications of the respective training images. This is disadvantageous as it is time-consuming and costly to generate modifications of the image that could fool the neural network and there is a high probability that modifications remain which are not covered by crafting adversarial examples, but which can still fool the neural network. In particular, with this approach, it is not possible to provide a robustness of the neural network against all possible adversarial perturbations of input images.

The disclosure proposes a method for determining whether a neural network is provably robust against perturbations such as adversarial perturbations. Consequently, the disclosure allows designing classifiers that are guaranteed to be robust to adversarial perturbations, even if the attacker is given full knowledge of the classifier. This guaranty holds over the whole space of possible adversarial examples of an input.

According to a first aspect of the disclosure, a method for testing an automated learning system is disclosed. It is tested whether the automated learning system is robust against modification less than or equal to a given magnitude. This implies that all arbitrary and/or possible modifications considering the magnitude constraint, do not change an output value of the automated learning system to a given target output value. Furthermore, it can be tested whether at least a modification of a test input value of the automated learning system changes the output value of the automated learning system corresponding to, preferably equal to, a given target output value.

The output value of the automated learning system corresponding to the target output value one can understand that the output value is equal to the target output value or the output value has its maximum at the same range or position as the target output value.

The test input value that is subject to the small modification causes the automated learning system to output the target output value when it is fed into automated learning system and propagated through the automated learning system. The modification of the test input value is less than or equal to a given modification magnitude. In particular, the modification is a small modification if, and only if, a size of the modification is less than or equal to a predetermined modification magnitude. The automated learning system comprises at least an input layer that receives the test input value and an output layer that outputs the output value of the automated learning system. The output value of the automated learning system may characterize a classification of the test input value into at least one of several classes.

The method for testing an automated learning system comprises the following steps:

Determining a second, preferably a superposed, output value dependent on the target output value and dependent on an output value that is assigned to the test input value and that may characterize a true classification of the test input value, in particular a label, which is assigned to the test input value. The superposed output value may characterize a superposed classification and may characterize a second classification.

It is proposed that the second output value is a superposed output value and wherein it is determined depending on either one of a difference between the output value and the target output value or a difference between the determined output value of the automated learning system and the target output value.

Providing a second automated learning system based on the automated learning system. The second automated learning system has the same layers, in particular same architecture, in particular the same connected layers in a reverse order, as the automated learning system. Each layer of the second automated learning system corresponds to, preferably exactly, one corresponding layer of the automated learning system.

The output layer of the second automated learning system corresponds to the input layer of the automated learning system, i.e. an output to the second automated learning system is outputted by the output layer of said second automated learning system, and said output layer corresponds to the input layer of the automated learning system. The input layer of the second automated learning system corresponds to the output layer of the automated learning system, i.e. an input to the second automated learning system is fed into the input layer of said second automated learning system, and said input layer corresponds to the output layer of the automated learning system.

Propagating the second output value through the second automated learning system.

Determining dependent on the output value that results from the propagation of the second output value through the second automated learning system, dependent on the modification magnitude, and dependent on the test input value whether the modification results in the output value of the automated learning system corresponding to the target output value.

The advantage of this aspect is that a robustness of the automated learning system can be efficiently determined due to the reusage of the automated learning system as a second automated learning system.

If the automated learning system does not determine the target output value and determines the correct output value, the automated learning system is robust against each possible modification with respect to the limitation that said modifications are less than or equal to the given magnitude. The target output values can be chosen dependent on the different aspects of the disclosure. In the first aspect, the given target output value is different from the labeled output value corresponding to the test input value. In the second aspect, the output value is different from the output value determined by the automated learning system depending on the test input value.

Preferably, the automated learning system comprises hidden layers, which are connected with each other by providing an output value as an input value for at least one of the hidden layers. The input layer can be connected with at least one of the hidden layers. The output layer receives at least one output value of the hidden layers and/or the output of the input layer as input.

Wherein the hidden layers of the second automated learning system are ordered in reverse order to the hidden layers of the automated learning system; i.e. each hidden layer of the automated learning system provides, at its output, an intermediate value that is passed on to an input of a subsequent hidden layer, and the layer of the second automated learning system that corresponds to the subsequent hidden layer provides, at its output, an intermediate value that is passed on to a layer of the second automated learning system that corresponds to said hidden layer. In other words, a signal that is fed into the input layer of the second automated learning system is propagated through a series of corresponding layers in reverse order to the layers of the automated learning system.

The magnitude characterizes an intensity or strength of the modification of the input value. The magnitude can be a value characterizing the modification. An example of the modification can be an adversarial perturbation. The modification can be measured by determining a norm value of the modification. Preferably, the modification is measured relative to the original input value without a modification.

The architecture of the automated learning system can be described by the layers and preferably, by the way the layers are arranged and connected with each other. The same architecture therefore means that the second automated learning system comprises the same arrangement of the layers similar to the automated learning system.

The automated learning system can be computer-implemented, for example as a (deep-) neural network or a convolutional neural network or a recurrent neural network or a CapsuleNetwork or a support vector machine, or a Gaussian Process.

It is proposed to utilize the automated learning system for a machine learning system. The machine learning system can be an intelligent machine like a robot, which learns to solve a predefined task, for example by exploring its environment and learning from feedback by its environment or from given feedback.

It is proposed to determine an objective function depending on the output value of the second automated learning system and depending on the modification magnitude and depending on the test input value. Then, the determined objective function is compared to a predetermined threshold. It is determined whether a small modification to the test input value does not cause the output value of said test input value to correspond to the target output value depending on the result of said comparison. If the determined objective function exceeds the predetermined threshold, it is determined that the small modification does not cause the output value of said test input value to correspond to the target output value.

Advantageously, a trained automated learning system is tested. Under trained automated learning system one can understand that the automated learning system is able to solve a given task, and the way to solve is self-learned by the automated learning system, in particular is captured in a parametrization of the automated learning system. Typically, automated learning systems learn complex relationships within the data, such as sensor values, and utilize the learned relationships to solve the given task. A trained automated learning system for classification is advantageously parametrized after a training procedure such that preferably a complete training data set is correctly classified according to the assigned classes to the training input values. However, the training procedure should be terminated after a given criterion is reached in order not to memorize the training data set.

In an alternative embodiment, the method according to the first aspect can be used to approval of an automated learning system.

The automated learning system can be a classifier. The automated learning system, in particular the classifier is configured to determine an output value, which characterizes a classification of the input value into at least one of several classes. In another embodiment, the automated learning system is configured to carry out a segmentation or a regression.

The term classification can be broadly understood. Classification can be that the automated learning system assigns to each input value of the automated learning system at least a class, wherein the class characterizes a property and/or a feature and/or an object of the input value. Segmentation can be seen as a special kind of classification, wherein for segmentation at least some of the elements of the input value are assigned to at least one class, also a semantic region can be assigned to at least one of the several classes. Image captioning and object recognition/detection can also be seen as a special kind of classification. The term regression means that the input value of the automated learning system is to be continued in a proper way by the automated learning system.

The input values of the automated learning system that is configured to carry out a classification or a regression are not limited to the given examples, they can be chosen as desired. The output values of the automated learning system that is configured to carry out a classification or a regression can characterize a classification or a regression of the corresponding input values of the automated learning system.

It is proposed to issue a robustness certificate when the modification does not result in the output value of the automated learning system corresponding to the target output value.

Note that the robustness certificate can also be generated after carrying out the other aspects of the disclosure.

According to a second aspect of the disclosure, a method for detecting a modification, in particular an adversarial example, of a test input value that results in an output value determined by the automated learning system corresponding to a target output value, is disclosed. The target output value may differ from the determined output value of the automated learning system. The second aspect can be utilized for detecting whether a test input value to the automated learning system may have been modified with a small modification, particularly an adversarial example of a test input value, such that an output value of said test input value, i.e. the output value that the automated learning system outputs when said test input value is fed into and propagated through the automated learning system, results in an output value that corresponds to a target output value.

For the different aspects of the disclosure, it is proposed to determine an objective function dependent on the output value of the second automated learning system and dependent on the modification magnitude and dependent on the test input value.

The objective function characterizes a guaranteed lower bound on the solution of determining whether the modification changes the output value to the target output value.

According to a third aspect of the disclosure, a method is disclosed for determining the largest possible modification magnitude of a modification to a test input value that does not cause a change of the corresponding output value to a target output value. The output value is that value that is outputted by the automated learning system when the test input value, particularly that is subjected to the modification, is fed into and propagated through the automated learning system.

This aspect is advantageous as the strongest modification magnitude without e.g. to misclassify the input into a false class can be determined, so that provably the output of the automated learning system cannot be flipped by the modified input value to the target output value.

It is proposed to determine several different second output values respectively for several different target output values that are respectively different from the determined output values or different from the output value that is assigned to the test input value. Said second output values are propagated through the automated learning system, which outputs a plurality of corresponding output values, wherein the objective function is determined depending on said plurality of corresponding output values, i.e. on all output values of said plurality of corresponding output values.

This has the advantage that guaranteed no modification of the input value within the given modification magnitude will fool the automated learning system, because no other class is provable determined by the automated learning system caused by the modification of the input value.

According to a fourth aspect of the disclosure, a method for training an automated learning system is disclosed. The method comprises the following steps:

Providing a given modification magnitude and training data, which comprise training input values and corresponding training output values. The training output values may characterize the true/labeled classification of the respective input values.

Providing a second automated learning system based on the automated learning.

Determining for each training input value a corresponding second output value dependent on a target output value and dependent on an output value that corresponds to the respective training input value, i.e. the output value that is outputted by the automated learning system when the respective training input value is fed into and propagated through the automated learning system.

Feeding as input value of the second automated learning system the second output values and propagating the second output values through the second automated learning system.

Determining at least an objective function dependent on the given modification magnitude and dependent on at least one of the training input values and dependent on at least one of the output values of the second automated learning system determined by propagating the second output value corresponding to said at least one of the respective training input value.

Determining a loss function, which is dependent on the determined objective function and dependent on at least the training output value corresponding to the respective training input value, which was utilized to determine the objective function.

Adjusting parameters of the automated learning system in order to optimize, in particular minimize, the loss functions with regard to a given optimization criterion.

A loss function measures or characterizes a difference, in particular by a mathematical distance measurement, between two values. The loss function can be either a: cross-entropy loss, hinge loss or zero-one loss. Advantageously, the optimization is done over a sum of loss functions, wherein each loss function is determined on at least one objective function.

It is proposed that according to the fourth aspect, the method further comprises the steps of: Determining a largest modification magnitude of the trained automated learning system with the method according to the third aspect of the disclosure. Continuing training of the trained automated learning system if said largest safe modification magnitude is less than a predetermined second threshold. This may include the step of resetting the values of some or all of the trained parameters of the automated learning system before continuing training.

For each aspect, it is proposed that each transformation of the layers is characterized by a respective function. The second transformation is characterized by a second function, which is related to a conjugate of the function, in particular a Fenchel conjugate function.

A function can map the input value of the respective layer on the corresponding output value or associates an input value set with the corresponding output value set according to the transformation, respectively. The function can be defined by some parameters.

For each aspect, it is proposed that an indicator function is defined for each layer of the automated learning system, wherein, for each layer, the corresponding indicator function is set to zero if the input of said layer is (directly) connected to exactly one further layer of the automated learning system. If not, the indicator function may be chosen equal to a value that is interpreted as "infinity", wherein the second function is determined depending on said indicator function. Preferably, it is an approximation of a conjugate function of the indicator function.

Note that if no skip connections are used, the related conjugate function is the exact conjugate function of the indicator function.

For each aspect, it is proposed that the objective function is determined dependent on a first term, which characterizes a product of the output of the second automated learning system multiplied by the input value of the automated learning system, and a second term, which characterizes a given norm of the output value of the second automated learning system weighted by the modification magnitude.

Note that when the modification magnitude of the modification of the input value of the automated learning system is determined by a first norm (e.g. $l_p$-norm), then the given norm is a dual norm (e.g. $l_q$-norm) of the first norm. The dual norm is defined as: $1/p+1/q=1$.

For each aspect, it is proposed that one of the layers is connected with at least two other layers and receives the output value of the connected layers as its input value. For each aspect, it is proposed that, at least one of the transformations is characterized by a non-linear function, in particular a rectified linear function (so-called ReLu function). For each aspect, it is proposed that at least one of the transformations is partly a linear transformation characterized by a parameter.

For each aspect, it is proposed that the input value of at least the layer, whose transformation is characterized by the non-linear function, has a limited allowable set of input values that is characterized by an upper and a lower bound.

This has the advantage that the values are bounded resulting in a more accurate objective function.

For each aspect, it is proposed that the automated learning system comprises a batch normalization layer. The transformation of the batch normalization layer is characterized by a shift of a mean and variance of the input value dependent on a given mean and given variance.

Note that preferably the given mean and given variance are given individually for each element of the input value.

For each aspect, it is proposed that the limited allowable set of input values is further limited to input values fulfilling a linear inequality.

The set of input value is thereby further limited. Thereby, a more accurate objective function can be determined. Furthermore, the parameters capture dependencies of the bounds and produce tighter bounds around the allowable set of values and consequently the bounds of an adversarial polytope at the output of the automated learning system, improved performance, in particular for large automated learning system with lots of layers. In addition, the bounds of the activation functions are tighter resulting in a smaller error and a training resulting in a more robust automated learning system can be achieved.

For each aspect, it is proposed that one of the parameters is a matrix comprising the upper and lower bounds of a previous connected layer.

For each aspect, it is proposed that the threshold for the objective function is not less than zero, and preferably not greater than a predetermined positive bias.

The bias characterizes a tolerance or safety margin of the decision, e.g. whether the automated learning system is robust or not against an adversarial example. Thereby, the reliability of the objective function is increased.

For the fourth aspect, it is proposed that the layers are grouped and the grouped layers are trained separately from each other.

This has the advantage that the impact of the modification magnitude in the objective function is reduced. Later, the whole cascade can be trained.

A physical actuator of a technical system can be controlled dependent on an output value of the automated learning system, in particular according to each aspect of the disclosure. In the case that the automated learning system has been tested according to the first aspect of the disclosure, the physical actuator can be at least collaterally or immediately controlled by the output value of the automated learning system. Moreover, the input value of the automated learning system can be tested according to the second aspect whether it is an adversarial example. If it is decided that the input value is not an adversarial example, then the physical actuator can be controlled dependent on the output value of the automated learning system, otherwise the output value of the automated learning system can be discharged rejected. The physical actuator can be a part of the technical system. The technical system can be for example an at least partly autonomous machine, robot, vehicle, mechanical tool, factory, or flying object, such as a drone. The physical actor may be a part of an engine or a brake.

It is proposed to have a computer-implemented method, wherein at least a processor carries out the steps of the methods of the different aspects of the disclosure. The automated learning system can also be implemented in hardware or a hybrid of hardware and software.

In another embodiment, the output value of the automated learning system can be used to determine control signal or control command. The control signal or the control command can be used to control the physical actuator. The physical actuator may be controlled corresponding to the control signal or the control command. In another embodiment, a control unit controls the physical actuator. The control unit can be configured to determine the control signal or the control command dependent on the output of the automated learning system. It is also possible that the control unit directly or indirectly controls the physical actuator dependent on the output value of the automated learning system.

The input values of the automated learning system can be received from sensor or can be received externally via the Internet or another data transmitting system or communication system.

In a further aspect of the disclosure, a computer program is proposed, which is configured to carry out any of the previous mentioned aspects of the disclosure. The computer program comprises commands which—when executed on a computer—cause said computer to carry out the methods with all of its steps of the different aspects of the disclosure. Furthermore, a computer readable storage is proposed on which the computer program is stored. Furthermore, an apparatus is proposed which is configured to carry out the methods of the disclosure.

In another aspect of the disclosure, a product is proposed that is obtained by carrying out one of the methods of the first to fourth aspect of the disclosure.

Embodiments of the above-mentioned aspects of the disclosure are described in the following description referring to following figures:

BRIEF DESCRIPTION OF THE DRAWINGS

FIG. 2 shows two schematic depictions of the output value each with the adversarial polytope and a decision boundary;

DETAILED DESCRIPTION

Figure 1:
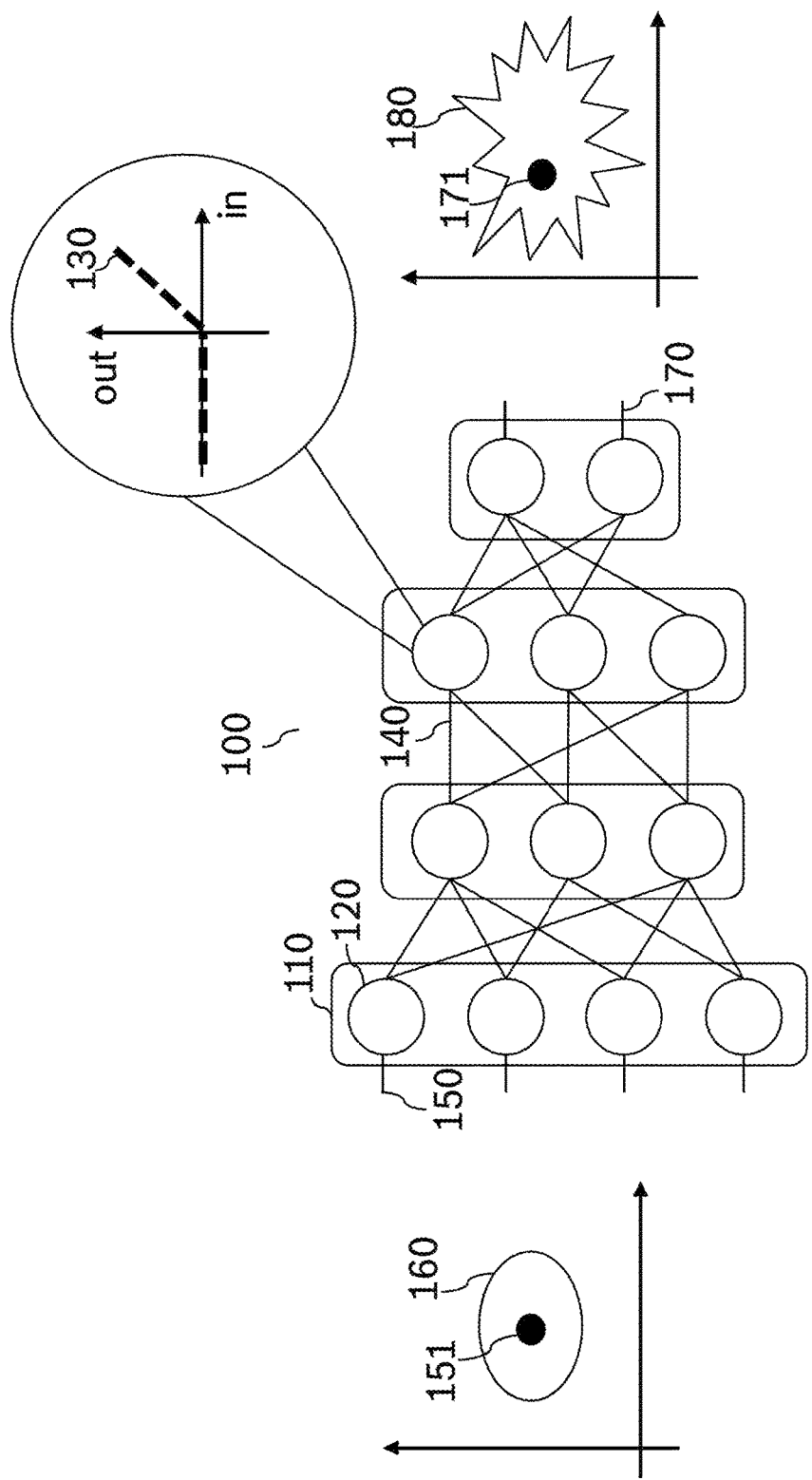
FIG. 1 shows a schematic depiction of a neural network with an input value and possible perturbations of the input value as well as an output value with an adversarial polytope.

FIG. 1 shows a schematic depiction of an embodiment of an automated learning system as a neural network 100. The neural network 100 comprises several layers 110. Each layer 110 comprises neurons 120, which have an input 150 and an output. The input value received at the input 150 of the neuron 120 is called activation of the neuron 120.

The neurons 120 determine dependent on their activation an output value. Further, the neurons comprise an activation function 130 that is utilized to determine the output value dependent on the activation of the respective neuron 120. The depicted activation function 130 in FIG. 1 is a rectified linear function (so-called ReLu).

The layers of the neural network 100 are (directly) connected with each other by connections 140. The connections 140 connect an output of the neuron of a first connected layer with an input of the neuron corresponding to a second connected layer and provide the output value as an input value to the connected neuron of the second connected layer. Preferably, the connections 140 multiply the output value by parameter and provide the multiplied output value as input value. One of the layers 110 is an input layer of the neural network 100. The input layer receives as input value an input value 151 of the neural network 100. The neural network 100 comprises further an output layer. The provided output value at output 170 of the output layer is an output value 171 of the neural network 100.

As depicted in FIG. 1, the layers 110 can be arranged in a row, wherein the layers are connected with a subsequent layer, respectively. The neural network 100 may comprise a batch normalization layer and/or a max-pooling layer and/or a linear-pooling layer.

The input value 151 of the neural network 100 can be a scalar, vector, matrix or tensor. For example, the input value can be a picture or audio signal or a sensor value. The output value 171 can be vector in this embodiment, which characterizes for example a classification of the input value into one of several classes. In this embodiment, each output 170 of the output layer characterizes one of the classes. The activations can be either a scalar, vector, matrix or a tensor dependent on the dimensions of the corresponding layers 110.

Considering k layers, the neural network $f_\theta$ is given by the equations:

$$z_i = \sum_{j=1}^{i-1} f_{i,j}(z_j), \text{ for } i = 2, \ldots, k \quad (1)$$

with the input value of the neural network $z_1 = x$ and $f_\theta(x) = z_k$ and a function $f_{i,j}$ from layer j to layer i and parametrization $\theta$.

As shown in FIG. 1, the input value 151 of the neural network 100 can vary within a given scope (input perturbation 160). For example due to measurement noise, the input value can vary, which can be characterized by a perturbation value $\epsilon$. The input value can also vary due to an adversarial modification of the input value. The modification can be locally limited, e.g. only a semantic region of an input image is modified, which is also characterized by the perturbation value $\epsilon$. The perturbation value $\epsilon$ can be a maximal value of the modification or a mean of the modification.

The maximum perturbation is depicted schematically in FIG. 1 by the bounded input perturbation 160. The bounded input perturbation 160 can be mathematically described as:

$$B(x) = \{x + \Delta : \|\Delta\|_p \leq \epsilon\} \quad (2)$$

where B (x) represents an input constraint for the maximum allowable input perturbation 160 and ($\|\Delta\|_p$) characterizes a p-norm-bounded modification $\Delta$ of the input value x. The modification $\Delta$ can be for example noise or an adversarial perturbation of the input value x, wherein the modification $\Delta$ describes all possible modifications due to e.g. noise or adversarial examples of the input value x. The perturbation $\epsilon$ can be seen as an upper bound of the modification $\Delta$ of the input value (x).

In order to decide whether there exists a modification $\Delta$ of the input value x within B (x) which can fool the neural network 100, following optimization problem has to be solved:

$$\min_{z_k} c^T z_k \qquad (3)$$

$$\text{subject to } z_i = \sum_{j=1}^{i-1} f_{i,j}(z_j), \text{ for } i = 2, \ldots, k$$

$$z_1 \in B(x)$$

where the input value x has assigned a given class $y^* = y^{true}$ and a target class $y^{targ}$ and $c = e_{y^*} - e_{y^{targ}}$. The target class $y^{targ}$ can be arbitrarily chosen and is a class different from the given class $y^*$. The result of the equation (3) is a scalar describing the most adversarial input value (x) within B (x), that is classified by the neural network as the target class $y^{targ}$, although the input value x belongs to the given class $y^{true}$. If this scalar is positive then there does not exist an adversarial example of the input value x, which fools the neural network due to a misclassification of the adversarial example. If the scalar is positive, then there exists a guaranteed robustness against all modifications within B (x).

The optimization problem according to equation (3) can be solved for all different target classes different from the given class $y^{true}$. If the result of the optimization problem according to equation (3) is positive for all target classes different from the given class, then there does not exist a norm bounded adversarial modification Δ of the input value x that could be misclassified by the neural network 100. The important point is that, if the minimum of equation (3) is positive, it is guaranteed that no adversarial example exist within B (x).

Because it would be very inefficient to solve the optimization problem according to equation (3), the problem can be bounded, in particular by a dual optimization problem. Note that a solution of the dual problem is a feasible dual solution and provides a guaranteed lower bound on the solution of the primal optimization problem as given in equation (3).

The dual problem can be built by adding the constraints into the primal optimization problem, e.g. with Lagrangian multiplies.

For the case, when skip connection are used, the constraints of the equation (3) are dependent on each other. Therefore, an indicator function is used to determine the dual optimization problem. The indicator function can be given as:

$$\chi_i(z_{1:i}) = \begin{cases} 0, & \text{if } z_i = \sum_{j=1}^{i-1} f_{i,j}(z_j) \\ \infty, & \text{otherwise} \end{cases} \qquad (4)$$

for $i = 2, \ldots, k$.

A 'pseudo'-conjugate function, related to a Fenchel conjugate function, of the indicator function is given by:

$$\chi_i^*(z_{1:i}) = \max_{z_i} -v_i^T z_i + \sum_{j=i+1}^{k} v_j^T f_{i,j}(z_i) \qquad (5)$$

for $i=1, \ldots, k-1$. Note that the conjugate function of equation (5) is not an exact conjugate function of equation (4), therefore $\chi_i^*$ is called a 'pseudo'-conjugate function.

The 'pseudo'-conjugate of the indicator function can be upper bounded by:

$$\chi_i^*(z_{1:i}) \leq h_i(v_{i:k}) \qquad (6)$$

$$\text{subject to } v_i = \sum_{j=i+1}^{k} g_{i,j}(v_j)$$

With previous equations, the optimization problem according to equation (3) can be rewritten as a lower bound of equation (3). This lower bound is expressed by:

$$\max_v \left( -\sum_{i=2}^{k} h_i(v_{i:k}) - \hat{v}_1^T x - \epsilon \|\hat{v}_1\|_q \right) \qquad (7)$$

$$\text{subject to } v_k = -c$$

$$v_i = \sum_{j=i}^{k-1} g_{i,j}(v_{j+1}), \text{ for } i = 1, \ldots, k-1$$

where $\| \|_q$ is the dual norm to the p-norm in equation (2).

The max-term can be written as an objective function J:

$$J(x, v_{1:k}) = -\sum_{i=2}^{k} h_i(v_{i:k}) - v_1^T x - \epsilon \|v_1\|_* \qquad (8)$$

The objective function J can be efficiently determined by using a dual neural network that is given by the following equation of equation (7):

$$v_k = -c \qquad (9)$$

$$v_i = \sum_{j=i}^{k-1} g_{i,j}(v_{j+1}), \text{ for } i = 1, \ldots, k-1$$

where $g_{i,j}$ is the dual layer, characterizing a dual transformation by a dual activation function of said layer.

In the following, two different dual layer are shown exemplarily. The dual layer for a linear layer ($z_{i+1} = W_i z_i + b_i$) can be expressed as:

$$\chi_i^*(z_{1:i}) = v_{i+1}^T b_i$$

$$\text{subject to } v_i = W_i^T v_{i+1} \qquad (10)$$

Figure 4:
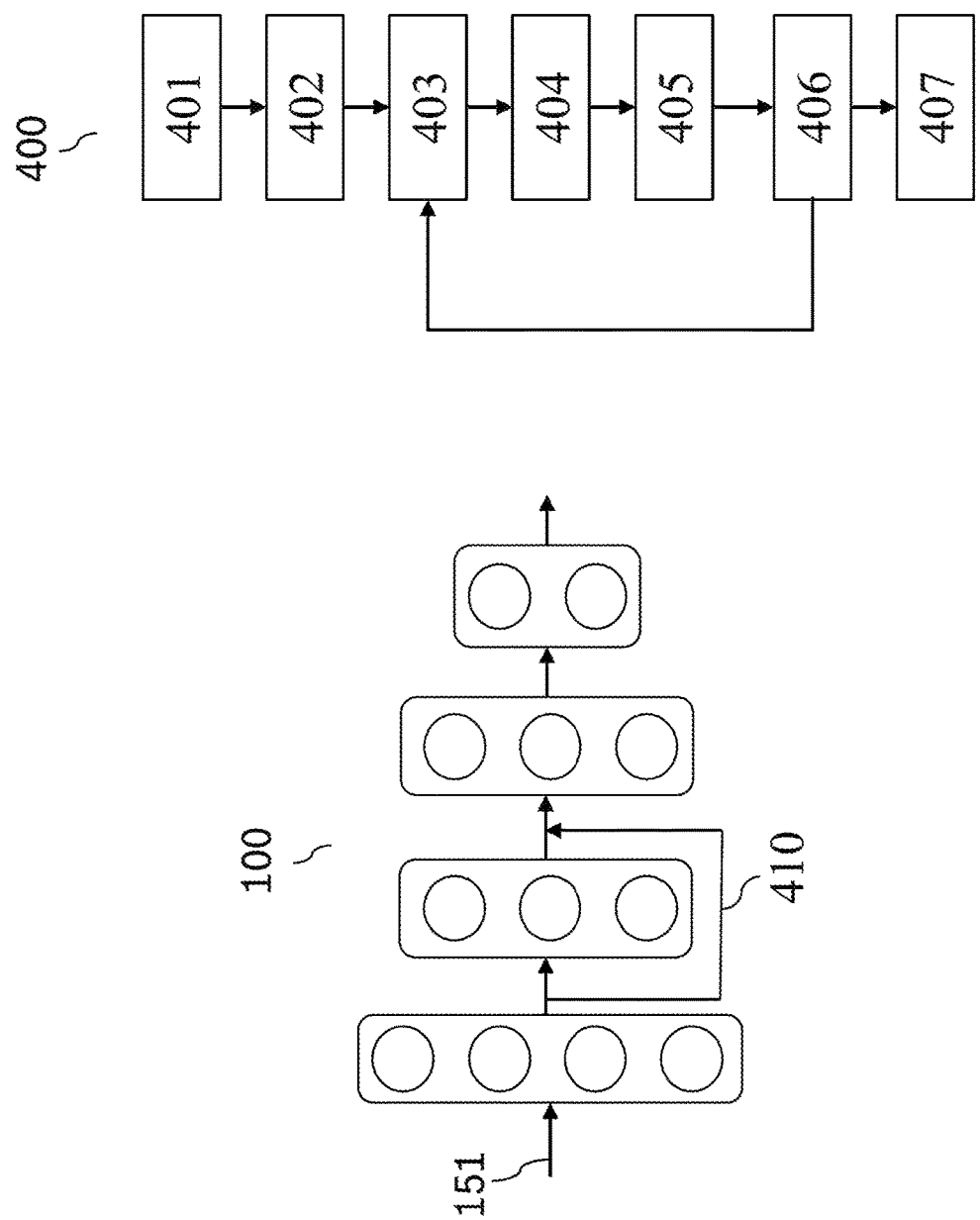
FIG. 4 shows schematically an embodiment of a flow chart of a method for determining upper and lower bounds of activation functions and shows a schematic depiction of the neural network with a skip connection.

The dual layer for the layer with the ReLu activation function ($z_{i+1} = \max\{z_i, 0\}$) is given as:

$$\chi_i^*(z_{1:i}) \leq -\sum_{j \in I_i} l_{i,j} \times \max[v_{i,j}, 0] \qquad (11)$$

$$\text{subject to } v_i = D_i v_{i+1}$$

where $D_i$ is a diagonal matrix:

$$(D_i)_{jj} = \begin{cases} 0 & j \in I_i^- \\ 1 & j \in I_i^+ \\ \dfrac{u_{i,j}}{u_{i,j} - l_{i,j}} & j \in I_i \end{cases} \quad (12)$$

and $I_i^-$, $I_i^+$, $I_i$ denotes a set of the negative, positive and spanning zero activations, respectively. These sets of activations are dependent on lower and upper bounds (u, l) of the corresponding activations and can be seen as auxiliary constraints. If the upper bound (u) of the activation is smaller than zero, the activation correspond to the set of activations $I_i^-$ with negative activations. If the lower bound (l) is positive, then the activation corresponds to the set of activations $I_i^+$ with positive activations. If the lower and upper bound span the zero point, then the activation corresponds to the set $I_i$. The method to determine the lower and upper bounds is shown in FIG. 4.

As already discussed, if the objective function is positive, then there does not exist modifications of the input value x that fools the neural network 100. However, if the objective function is negative, it is not possible to guarantee whether the modification of the input value x changes the classification of input value to the target classification. As in FIG. 2 schematically shown, the output value 171 of the neural network 100 is bonded by an output adversarial polytope 180. The output adversarial polytope 180 is a non-convex set due to the non-linear activation functions, such as the ReLu activation function, of the neural network 100. For simplification, the non-linear activation functions can be approximated, which results in an approximation of the output adversarial polytope 180.

The approximation of the ReLu activation function can be done by bounding the ReLu with a convex hull. The convex hull is described by three linear equations, one for the negative input values, one for the positive input values and a third linear equation, which closes the spanned area of the two linear equations to a convex hull.

The approximation of the output adversarial polytope is shown in FIG. 2 by the bounded convex polytope 200.

Furthermore, FIG. 2 shows a decision boundary 201, which crosses the output adversarial polytope 180 and the bounded convex polytope 200. This implies that the output value 171 of the neural network 100 can be misclassified if it is within the area 220 of the output adversarial polytope 180. If the modification of the input value results in a shift of the output value of the neural network 100 into the area 220, this would result in a false classification of the input value. For this case, the objective function would be negative since a shift of the output value 171 could result in another classification, when crossing the decision boundary 201. For this case, there does not exist a robustness against misclassify modifications of the input value.

If a second decision boundary 202 crosses only the bounded convex polytope 200, but not the output adversarial polytope 180, then the objective function J is also negative although any modification of the input value x would not result in false classification since all possible output values lie within the output adversarial polytope 180 which is not divided by the second decision boundary 202. For this case, there would be a robustness against misclassify modifications of the input value. However due to the approximation of the output adversarial polytope 180, the objective function (J) is not accurate.

Therefore, if the objective function J is negative, it is not possible to decide whether modification of the input could fool the neural network 100. Only for positive objective functions, a guaranteed decision can be made that the modification of the input value does not fool the neural network 100.

Figure 3:
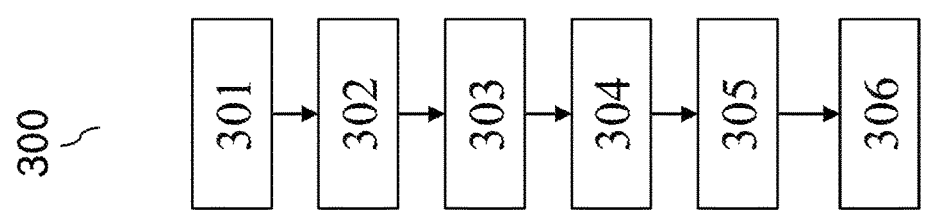
FIG. 3 shows schematically an embodiment of a flow chart for a method for determining an objective function.

FIG. 3 shows a schematic flow chart 300 of a method for determining the objective function J of equation (8).

The method starts with step 301. In this step 301, the input value x and the true classification $y^{true}$ of the input value x and the target classification $y^{targ}$ and a given perturbation $\epsilon$ are provided.

Then, in the step 302, the variable c according to equation (3) is determined.

In the subsequent step 303, the input value x is propagated through the neural network 100 and the upper and lower bounds (l, u) of the activations of the neurons (or the activation functions) are determined. The method for determine these bounds (l, u) is shown in FIG. 4.

After finishing step 303, step 304 is carried out. In this step, the dual neural network is build according to the equation (9). Afterwards, step 305 is carried out. In this step, the variable c is propagated through the dual neural network according to equation (9). A more detailed description of the steps 304 and 305 is given in FIG. 5.

In step 306, the objective function J according to equation (8) is determined dependent on the input value x and dependent on the output value $v_1$ of the dual neural network and the given perturbation $\epsilon$.

FIG. 4 shows the neural network 100 with a skip connection 410. In this embodiment of the neural network 100, all neurons may have a ReLu activation function. Further, FIG. 4 shows an embodiment of a flow chart 400 of a method for determining the upper and lower bounds of the input value of the layers of the neural network 100 with a skip connection 410, in particular a method for determining the upper and lower bounds of the activations of the neurons with a ReLu activation function.

The method for determining the upper and lower bounds of the input value of the layer starts with step 401. In this step, the input value x and the perturbation $\epsilon$ are provided and diverse variables are initialized according to following equation:

$$\hat{v}_1 := W_1^T$$

$$\gamma_1 = b_1^T$$

$$l_2 = x^T W_1^T + b_1^T - \epsilon \|W_1^T\|_{1,:}$$

$$u_2 = x^T W_1^T + b_1^T + \epsilon \|W_1^T\|_{1,:} \quad (13)$$

wherein $\|\cdot\|_{1,:}$ denotes the matrix $l_1$ norm of all columns, for this example. Other norms are also conceivable.

In step 402, a loop is started over the layers of the neuronal network. The loop is initialized by i=2 and repeated until i equals k−1. In the first step 403 of the loop, the activations sets $I_i^-$, $I_i^+$, $I_i$ are determined dependent on the values of the upper and lower bounds of the layer (i).

Then, in step 404 new terms are initialized according to the equations:

$$v_{i,I_i} := (D_i)_{I_i} W_i^T$$

$$\gamma_i = b_i^T \quad (14)$$

Afterwards (step 405), the existing terms are propagated according to equation:

$$v_{j,I_i'} := v_{i,I_i}(D_i)_{I_i} W_i^T, j=2, \ldots, i-1$$

$$\gamma_i := \gamma_i D_i W_i^T, j=1 \ldots, i-1$$

$$\hat{v}_1 := \hat{v}_1 D_i W_i^T \qquad (15)$$

In step 406, the bounds are computed as:

$$\psi_i := x^T \hat{v}_1 + \sum_{j=1}^{i} \gamma_j \qquad (16)$$

$$l_{i+1} = \psi_i - \epsilon \|\hat{v}_1\|_{1,:} + \sum_{j=2}^{i} \sum_{i' \in I_i} l_{i,j} \max[-v_{j,i'}, 0]$$

$$u_{i+1} = \psi_i + \epsilon \|\hat{v}_1\|_{1,:} - \sum_{j=2}^{i} \sum_{i' \in I_i} l_{i,j} \max[v_{j,i'}, 0]$$

Additionally, the loop index i is increased in step 406. If i equals k−1, then step 407 is carried out. In this step, the upper and lower bounds $l_{1:k}$, $u_{1:k}$ are returned. Otherwise (i<k−1), steps 403 to 406 are repeated. Note that if not each neuron has a non-linear activation function, it is not required to determine the bounds for each neuron.

Note that if the neural network comprise other non-linear activation functions, equation (16) can be modified with respect to equation (6) by replacing each sum: $\pm\Sigma_{j=2}^{i}\Sigma_{i'\in I_i}\pm$ by $\pm\Sigma_{j=1}^{i} h_j(\pm v_j, \ldots, \pm v_i)$, respectively. In addition, the dual transformations $g_i$ have to be applied in step 404 and 405.

Figure 5:
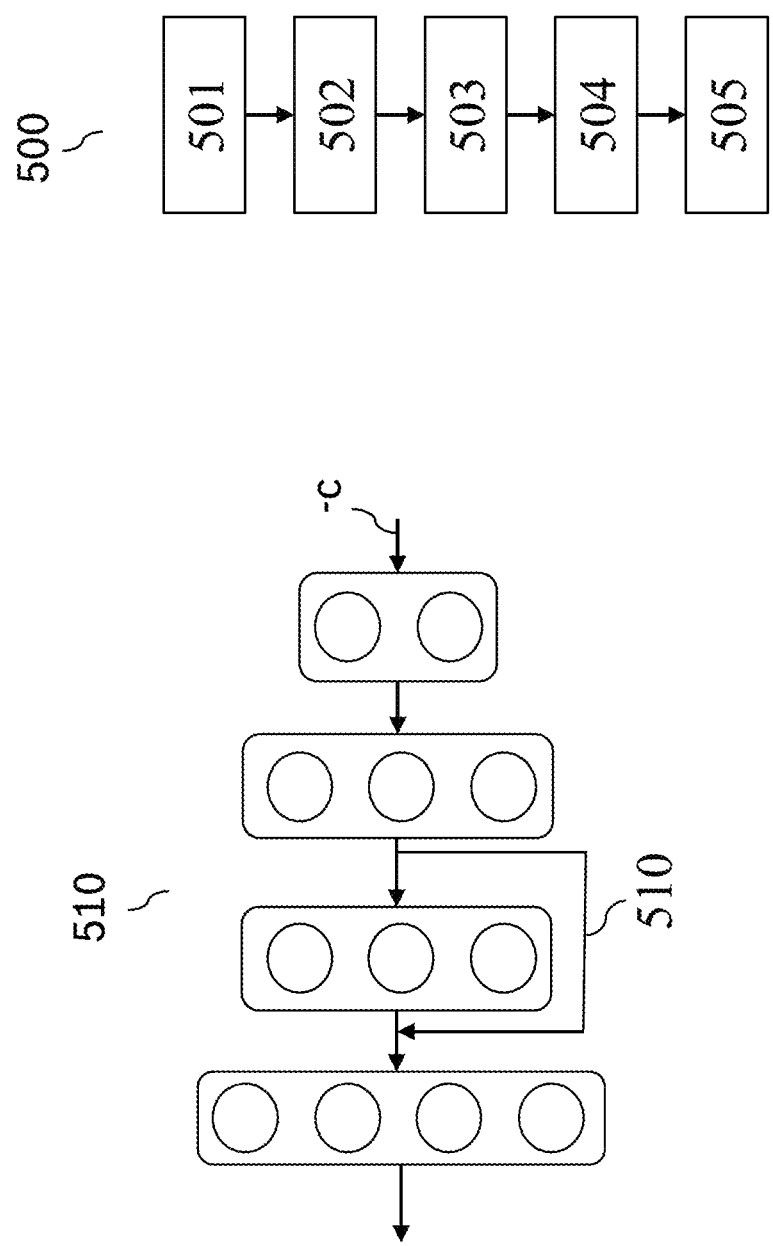
FIG. 5 shows a schematic embodiment of a flow chart of a method for propagating an input value through a dual neural network and shows further a schematic depiction of the dual neural network.

FIG. 5 shows the dual neural network 510 with a dual skip connection 510. In this embodiment of the dual neural network 510, the dual neural network 510 is created based on the neural network 100 shown in FIG. 4. Further, FIG. 5 shows an embodiment of a flow chart 500 of a method for building the dual neural network 510 and propagating an input value −c through the dual neural network 510 according to equation (9).

This method starts with step 501 by creating the dual neural network 510. Exemplarily, the architecture of the neural network 100 is copied and the input layer and output layer of the neural network 100 are reconfigured as output layer and input layer of the dual neural network 510, respectively. This means that when the input value −c is propagated through the dual network 510, relative to the propagation of the input of the neural network 100, the input of the dual neural network 510 is propagated backwards. Note that when the dual network in FIG. 5 is rotated by 180 degree, than the input value of the dual neural network propagates forward through the dual neural network relative to the neural network 100.

In step 502, the activation functions of each layer are replaced by a respective dual activation function. The dual activation function can be determined according to equations (6) or equations (10) to (12).

In subsequent step 503, the input of the dual neural network 510 receives as input the variable c or according to equation (9) as input value is utilized −c to determine the objective function J as solution of the dual problem.

Thereafter (step 504), the input of the dual neural network 510 is propagated layer-wise through the dual network 500. After the output layer has determined its output value in step 504, in the succeeding step 506, this output value is returned as output value of the dual neural network 510.

Figure 6:
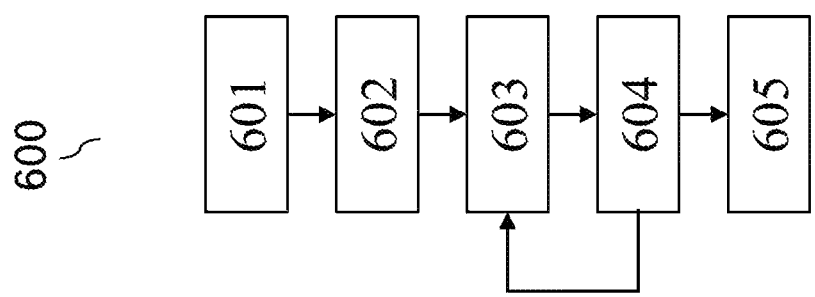
FIG. 6 shows schematically an embodiment of a flow chart of a method for training the neural network by the objective function.

FIG. 6 shows an embodiment of a flow chart 600 of a method to train the neural network 100 to be guaranteed robust against adversarial perturbations of the input values of the neural network 100.

This training method starts with step 601. Here, training data comprise N training input values x and N training output values $y^{true}$, which are assigned to the trainings input values x, respectively. The output values $y^{true}$ can be true classifications of the respective input values x. The perturbation value $\epsilon$ is also given in step 601. Note that the training data comprising N pairs of input values and output values is called a batch. If more than one batch is available, this method can be repeated for each batch. Additional or alternative, the method can be repeated for the same batch several times until a given criterion is met. Note that this training method can be also used for unsupervised learning, wherein in accordance with the unsupervised learning approach, the training data should be accordingly structured and/or labeled. It is also conceivable that each training input value x may have more than one corresponding training output values $y^{true}$.

Subsequently, a loop for i=1, ..., N over the training data is started in step 602.

In step 603, for the i-th training input value $x_i$, the variable $c_i$ according to equation (3) is generated for each desired target classification $y_i^{targ}$ different from the assigned true classification $y_i^{true}$. The variable $c_i$ for each desired target classification can be expressed as a matrix: $e_{y_i} 1^T - \text{diag}(1)$. Each determined variable $c_i$ comprised in said matrix, can be utilized to determine the objective function J for the i-th training input value $x_i$. Then, the objective function $J_i$ is determined according to the method shown in FIG. 3.

Afterwards (step 604), a loss function $L_i$, characterizing a difference between the determined objective function $J_i$ and the training output value $y_i$, is determined. Preferably, a 0-1 loss function is utilized. It is also possible to use several different loss functions for the different output values of the dual network 500, objective functions and/or for the different utilized training output values. The index i of the loop is increased by one and steps 603 and 604 is repeated until the index i equals N, as defined in step 602.

When the loop over all training data is finished, step 605 is carried out. Here, each determined loss function $L_i$ is summed up and the sum over all loss functions is optimized, for example:

$$\min_{\theta} \sum_{i=1}^{N} L_i\{-J_\epsilon(x_i, g_\theta(e_{y_i} 1^T - \text{diag}(1))), y_i\} \qquad (17)$$

The equation (17) can be optimized by gradient descent. The gradient descent determines the change $\Delta\theta$ of the parameter $\theta$ of the neural network (100) in order to minimize the sum over the loss functions $L_i$. Advantageously, the change $\Delta\theta$ of the parameter $\theta$ is used to adjust said parameters and step 605 is repeated until the determined change $\Delta\theta$ of the parameter $\theta$ is smaller than a given threshold.

Figure 7:
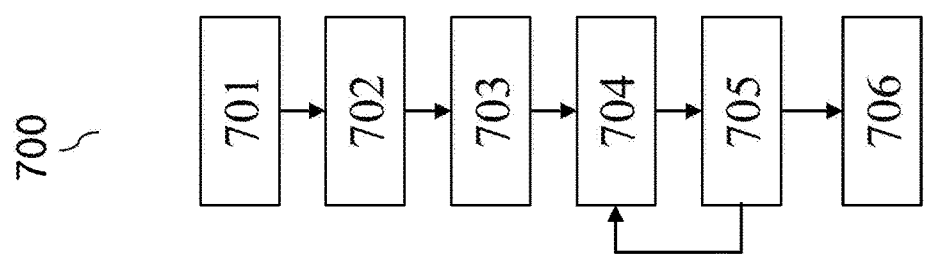
FIG. 7 shows a schematic embodiment of a flow chart of a method for determining a random Cauchy projection.

FIG. 7 shows schematically a flow chart 700 of a method to increase the efficiency and speed up the training of the neuronal network 100 as described in FIG. 6, particularly to speed up step 603. It is also possible to utilize this method to speed up the step 306 of FIG. 3.

Recap the objective function defined by equation (8): $J(x, v_{1:k}) = -\Sigma_{i=2}^{k} h_i(v_{i:k}) - v_1^T x - \epsilon \|v_1\|_q$. The computation of the second and third term $(v_1^T x, \epsilon \|v_1\|_q)$ are dependent on the whole dual neuronal network 500, and therefore computationally expensive. However, these terms can be efficiently approximated according to the shown method in FIG. 7.

In the first step 701, the lower and upper bounds for each layer of the dual network 500 are given.

In the next step 702, a matrix $R_1$ is initialized with a size of $|z_1| \times r$. The elements of the matrix $R_1$ are sampled from a Cauchy distribution. Note that this matrix $R_1$ corresponds to the $l_1$ bound.

Subsequently, in step 703, a loop over the layers $i=2, \ldots, k$ is started with loop index i.

In the step 704, over an index $j=1, \ldots, i-1$ is iterated, wherein for each value of the index j, a new random matrix $R_j^i := \sum_{k=1}^{i-1} g_{k,i}^T(R_i^k)$ is determined and $S_j^i := \sum_{k=1}^{i-1} g_{k,i}(S_i^k)$ is determined. This corresponds to propagating r random vectors (and an additional vector, e.g. $1^T$) through the dual network.

After step 704 has been finished, step 705 is carried out. In step 705, a new matrix $R_i^1 := \text{diag}(d_i)\text{Cauchy}(|z_i|, r)$ and $S_i^1 := d_i$ are determined ($d_i$ is determined according to equation (19)). Then, the index i is increased by one and steps 704 and 705 are repeated until i=k is fulfilled.

In step 706, the term $\|v_1\|_q$ and the term $h_i(v_{i:k})$ for the ReLu layer can be more efficiently calculated. For the case that the dual norm is equal to the 1, norm, this can be efficiently calculated by:

$$\|v_1\|_1 \approx \text{median}(|g(R)|) \approx \text{median}(|RW_1^T D_2 W_2^T \ldots D_n W_n|) \approx \text{median}(|v_1^T R|) \quad (18)$$

where R is a $|z_1| \times r$ standard Cauchy random matrix, and the median is taken over the second axis.

The second term of the ReLu function is expressed as:

$$\sum_{j \in I} l_{i,j} \times \max[v_{i,j}, 0] \approx \frac{1}{2}\left[-(\text{median}(|g_j(h(R))|) + g_j(h(1^T))\right] \approx \quad (19)$$

$$\frac{1}{2}(-\text{median}(|v_i^T \text{diag}(d_i) R|) + v_i^T d_i)$$

$$\text{with } d_{i,j} = \begin{cases} \dfrac{u_{i,j}}{u_{i,j} - l_{i,j}}, & j \notin I_i \\ 0, & j \in I_i \end{cases}$$

Figure 8:
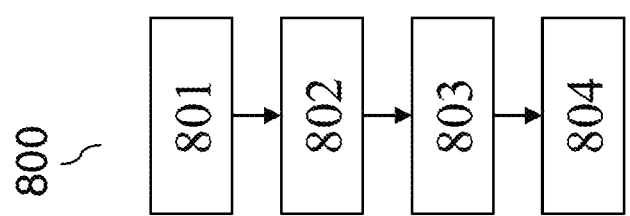
FIG. 8 shows schematically an embodiment of a flow chart of a method for detecting adversarial examples during interference of the neural network.

FIG. 8 shows an embodiment of a flow chart 800 of a method for detecting possible adversarial examples of the input value x.

In the first step 801, the neural network 100 determines dependent on an input value an output value $y^{pred}$.

In step 802, the objective function J is determined for all possible target classifications according to following equation:

$$J_\epsilon(x, g_\theta(e_{y^{pred}} 1^T - \text{diag}(1))) \quad (20)$$

In the succeeding step 803, the objective function J is compared with a threshold. For example: $J_\epsilon(x, g_\theta(e_{y^{pred}} 1^T - \text{diag}(1))) \geq 0$, then there does not exist a modification of the input that can be misclassified by the neural network 100. If the objective function J is positive, then the result of the comparison is true, which characterizes that there does not exist a modification of the input image within the ball B(x) that could be misclassified. Otherwise, if the objective function is not positive, the result of the comparison is false.

Optionally, step 804 is carried out. In this step, the output value $y^{pred}$ of the neural network 100 is released or rejected dependent on the result of the comparison. E.g. if the result of the comparison is true, the output value $y^{pred}$ can be utilized to control a technical system (for more information, see FIG. 12). Alternative, an authorization signal or a robustness certificate can be generated, when the result of step 803 is true. The authorization signal or the robustness certificate can be used to check before utilizing the output value $y^{pred}$. Preferably, the authorization signal and/or the robustness certificate are encrypted to prevent a maliciously manipulating.

Figure 9:
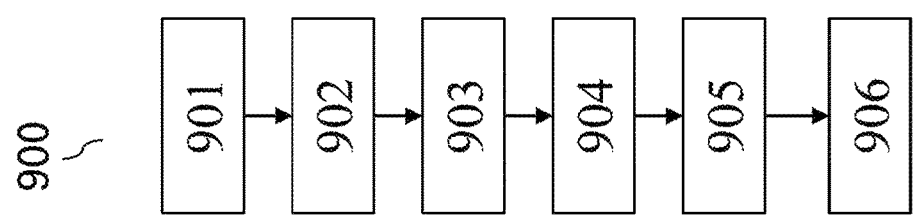
FIG. 9 shows a schematic embodiment of a flow chart of a method for finding a maximal allowable perturbation of the input value(s)

FIG. 9 shows schematically a flow chart 900 of a method to determine the largest perturbation value $\epsilon$ such that the output value of the neural network 100 cannot be flipped probably to another class than the determined class by the neural network 100. This can be also seen as a measurement, how far the decision boundary is away from the output of the neural network.

In the first step 901, the neural network 100 determines dependent on an input value an output value $y^{pred}$.

In step 902, the objective function J is determined for all possible target classifications $J_\epsilon(x, g_\theta(e_{y^{pred}} 1^T - \text{diag}(1)))$.

Subsequently (step 903), the largest perturbation value $\epsilon$ is determined. This can be determined according to following equation:

$$\max_\epsilon \epsilon \quad (21)$$

$$\text{subject to } J_\epsilon(x, g_\theta(e_{y^{pred}} 1^T - \text{diag}(1))) \geq 0$$

Particularly, equation (21) can be solved utilizing Newton's method. Additionally or alternatively, a binary search can be used to solve equation (21). Another way to solve equation (21) can be by incrementally increasing $\epsilon$ while the objective function stays positive.

Optionally, if the largest perturbation value for the given input value is determined, step 901 until 903 can be repeated for another input value. If more than two largest perturbations are determined for different input values, step 904 can be carried out. Here, the smallest determined perturbation value is ascertained and returned. Dependent on this returned perturbation value, a robustness certificate can be generated. This robustness certificate can be used in one of the described methods, where a given perturbation value $\epsilon$ is required.

Figure 10:
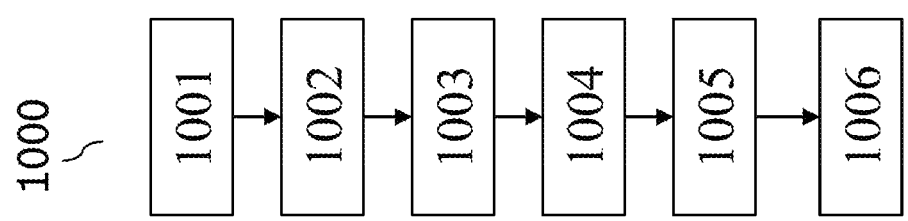
FIG. 10 shows a schematic embodiment of a flow chart of a method for determining tighter bounds of the activation function.

FIG. 10 shows schematically an embodiment of a flow chart 1000 of a method for determining tighter bounds of the activation functions, in particular of the neurons with a ReLu activation function.

The method starts with step 1001. In this step a neural network 100 is given, wherein the neural network can be described by $f_\theta$ with ReLu activation functions and exemplary with a batch normalization layer. Moreover, in step 1001 the input value x and the perturbation $\epsilon$ are provided.

In the subsequent step 1002, upper and lower bounds $l_i$, $u_i$ are determined for each layer i, in particular for each neuron of the layers. The upper and lower bounds can be determined according to the method shown in FIG. 4. Alternatively, the upper bounds can be determined by propagating through the dual neural network 500 the variable c, which is given for this case by a positive diagonal matrix c=I, which can be column-wise propagated through the dual neural network 500 and the max. values for each layer of said propagated diagonal matrices scaled dependent on the input value (x) are used as the upper bounds. The same procedure can be done by propagating c=−I and determine thereof the maximum value, which are the lower bounds.

Then, in step 1003, in addition to the determined upper and lower bounds of step 1002, a linear inequality $A_i z_i \leq b_i$ is initialized and the input value $z_i$ of the layer i are limited to following allowable $\tilde{Z}_i$ set of input values:

$$\tilde{Z}_i = \{z_i | l_i \leq z_i \leq u_i \cup A_i z_i \leq b_i\} \quad (22)$$

The initialization of the matrix $A_i$ is done by choosing an arbitrary size m of the first dimension of the matrix $A_i$, wherein the second dimension is dependent on the size of the layer: $\dim(z_i)$. The first dimension of the matrix $A_i$ can be proportional to the position of the corresponding layer i in the neural network 100 and polynomial to the number of neurons of the corresponding layer i.

Preferably, the first layer of the neural network 100 comprises a matrix $A_i$, which has the advantage that a better approximation of the norm bounded modification of the input value can be described. Deeper layers, e.g. the last few layers, should comprise a matrix $A_i$ in order to minimize the error between the output adversarial polytope 180 and the bounded convex polytope 200. Furthermore, the deeper the layers of the neuronal network 100 get, the larger the size of the matrix $A_i$ should be chosen. By choosing a certain size m of the matrix $A_i$, m additional constraints are added to limit the allowable set $\tilde{Z}_i$ of input values.

In another embodiment of the matrix $A_i$, said matrix can be a convolution matrix.

In step 1004, the elements of the matrix $A_i$ are determined. There are two options to determine the elements of the matrix $A_i$. In the first option, the elements are randomly sampled from a given distribution (e.g. Gaussian distribution, aligned around the origin). In the other option, the elements are the upper and lower bounds of a previous layer.

The vector $b_i$ of the linear inequality $A_i z_i \leq b_i$ can be determined according to the alternative method for determining the upper bounds by propagating $c_i = A_i$ row-wise through the dual neural network to determine the vector $b_i$ (similar to step 1002 for determining the upper and lower bounds by propagation the matrix I through the dual neural network).

In the succeeding step 1005, the elements of the matrix $A_i$ are optimized. For the case that the activation functions are given by the ReLu activation function, the optimization over the elements of the matrix $a_i$ can be done by solving the following equation in particular by gradient descent dependent on the elements of the matrix $A_i$:

$$\min_{\lambda \geq 0} b_i^T \lambda + \sum_{j \in I_i^-} \max\{(a_{i,j}^T \lambda + v_{i,j}) l_{i,j}, (a_{i,j}^T \lambda + v_{i,j}) u_{i,j}\} + \quad (23)$$
$$\sum_{j \in I_i^+} \max\{(a_{i,j}^T \lambda + v_{i,j} - v_{i+1,j}) l_{i,j}, (a_{i,j}^T \lambda + v_{i,j} - v_{i+1,j}) u_{i,j}\} +$$
$$\sum_{j \in I_i} \max\{(a_{i,j}^T \lambda + v_{i,j}) l_{i,j}, (a_{i,j}^T \lambda + v_{i,j} - v_{i+1,j}) u_{i,j}, 0\}$$

In a further embodiment, the step size of the gradient descent can be varied dependent on the progress of finding the minimum of equation (23).

If the elements of the matrix $A_i$ are chosen to be the upper and lower bounds of the previous layer, the elements of the matrix $A_i$ can be optimized according to equation (23) similarly by utilizing gradient descent. Additionally or alternatively, the initialized matrix $A_i$ can be optimized by multiplying the matrix $A_i$ by an inverse matrix characterizing the transformation of the previous layer. Preferably, the inverse matrix is the inverse or pseudo-inverse, left- or a right inverse of the matrix $W_i$ containing in particular the weights of the previous layer.

After the elements of the matrix $A_i$ are optimized in step 1005, the vector $b_i$ can be updated in step 1006. For example as done in step 1004.

In an optional subsequent step, the upper and lower bounds can be update, e.g. according to step 1002. It is possible to repeat the step 1005 and step 1006 since the the matrix $A_i$ and the vector $b_i$ are linked with each other and if one of them is changed, the other has to be adapted.

The dual transformations of the respective dual layer i of the dual neural network can be determined by the matrix $A_i$ together with the already determined or update upper and lower bounds of the respective dual layer i. The optimization problem according to equation (23) has to be solved (e.g. by gradient descent) dependent on $\lambda$ (find a value for $\lambda$ that minimizes the optimization problem of equation (23)) to determine the dual transformation, which is characterized by equation (23) as an upper bound according to equation (6) of a conjugate ReLu function.

Figure 11:
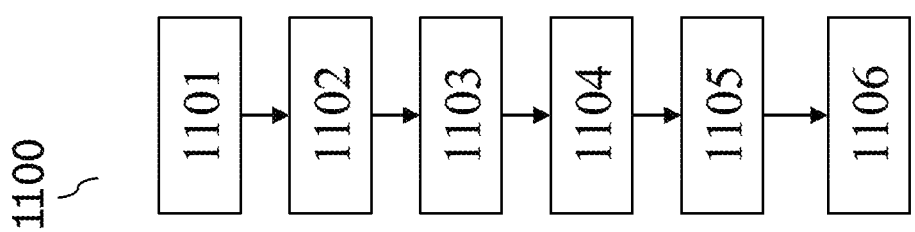
FIG. 11 shows schematically an embodiment of a flow chart of a method for operating an at least partly autonomous robot with the neural network.

FIG. 11 depicts a flow chart 1100 of a method for utilizing the trained neural network 100 for controlling a technical system, such as a partly autonomous robot or vehicle, and optionally detecting adversarial examples before controlling the technical system. Note that different configurations of the technical system are shown exemplary in the subsequent FIGS. 12 to 18.

Figure 19:
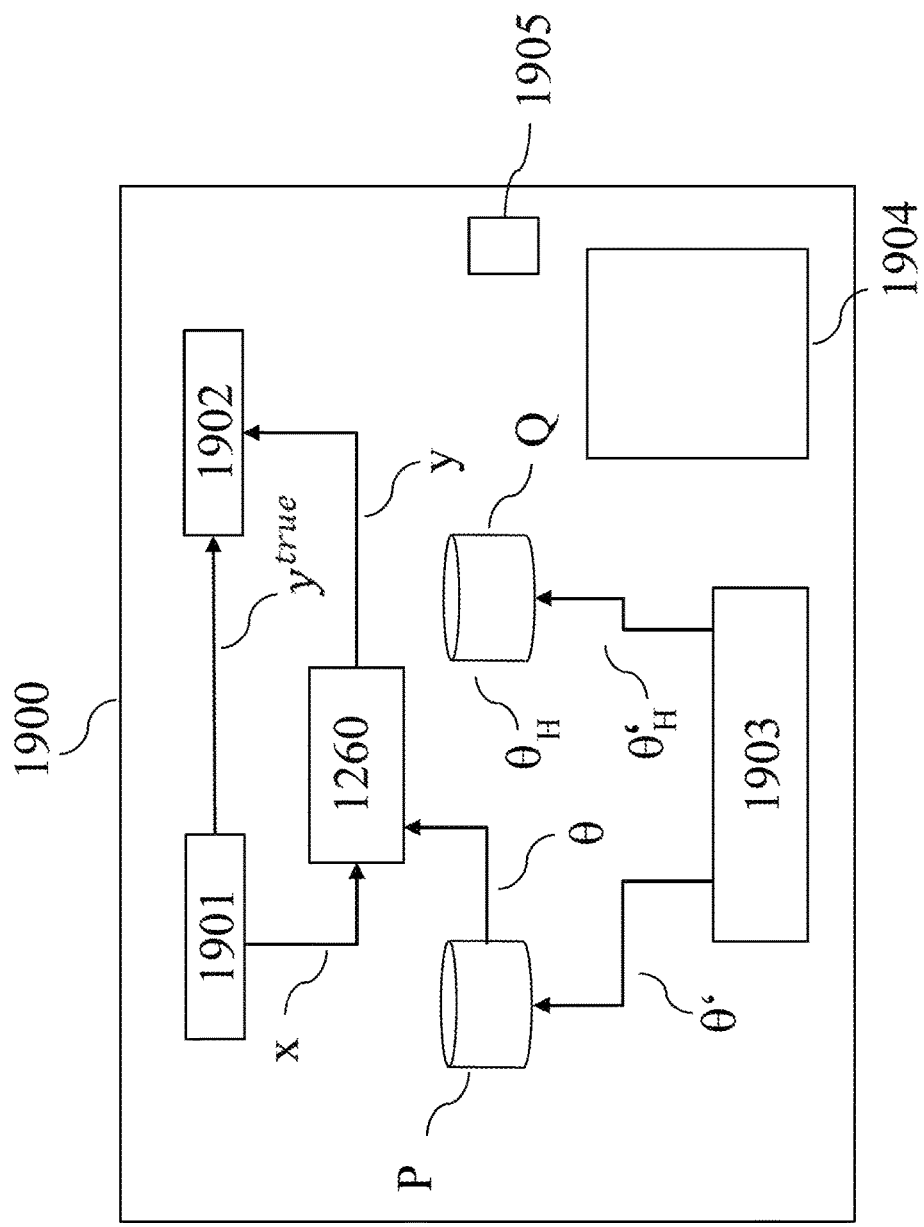
FIG. 19 a training system configured to train a robust neural network.

This method starts with step 1101. This step is used to acquire training data D comprising training input images and assigned training output values. The training input images can be images of a camera and the respective training output values can characterize a classification of the training images into one of several classes, e.g. class pedestrian or different road signs. These training data D can be provided a training system as shown in FIG. 19, which is configured to train the neural network 100 according to the method described in FIG. 6.

Subsequently (step 1102), the neural network 100 is trained according to the method described in FIG. 6 with the training data D of step 1101. After training the neural network 100, the method for determining the largest perturbation $\epsilon$ as described in FIG. 9 may be carried out, preferably, each training input image is used to determine the largest perturbation $\epsilon$. Step 1102 can be carried out on a server or in the technical system itself. The trained neural network, in particular the parametrization and optional the architecture, and when applicable, the largest perturbation $\epsilon$ can be transmitted from the server into the technical system and stored in a storage of the technical system. Additionally, the method for testing the trained neural network on whether a modification of the input image can fool the trained neural network according to FIG. 3 can be carried out.

In step 1103, a sensor, e.g. the camera, of the technical system senses an environment and the trained neural network receives the sensor value, e.g. image.

In step 1104, the trained neural network determines an output value dependent on the sensor value.

Step 1105 may be carried out. Here, the received sensor value is checked whether it is an adversarial example of the sensor value as described in FIG. 8. An authentication signal can be generated dependent on the result of the detection of an adversarial example.

After step 1104 or step 1105, step 1106 is carried out. Dependent on the output value of step 1104, a control signal for the technical system is generated. The control signal may depend on the authentication signal of step 1105. In one embodiment, only if the authentication signal characterizes that the input of the neural network is not an adversarial example, then the control signal is generated. In another embodiment, the generated control signal can be discard dependent on the control signal. A motor or a braking system of the technical system can be controlled by the control signal of step 1106.

Figure 12:
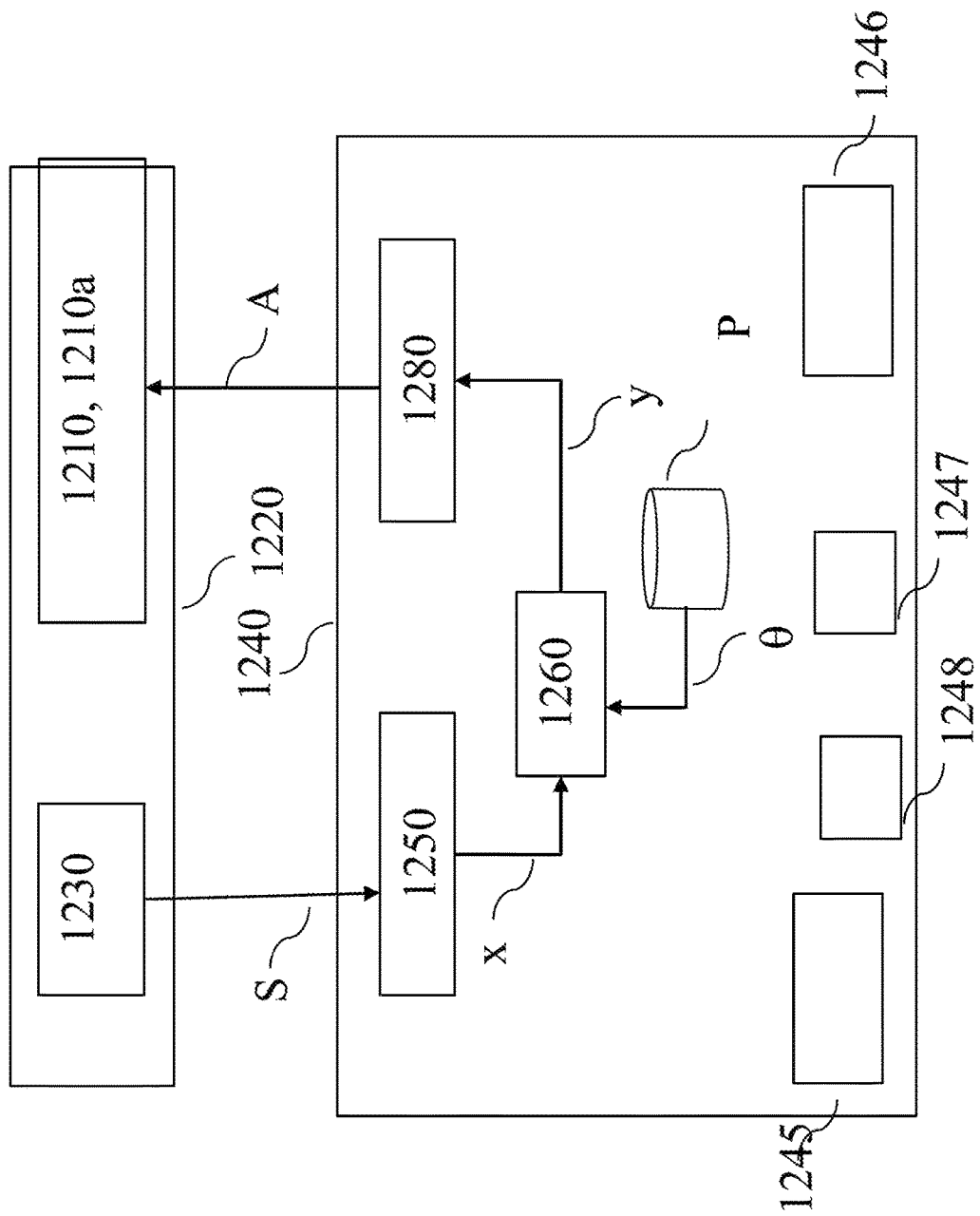
FIG. 12 an actuator control system having an automated learning system controlling an actuator.

Shown in FIG. 12 is one embodiment of an actuator 1210 in its environment 1220. Actuator 1210 interacts with an actuator control system 1240. Actuator 1210 and its environment 1220 will be jointly called actuator system. At preferably evenly spaced distances, a sensor 1230 senses a condition of the actuator system. The sensor 1230 may comprise several sensors. An output signal S of sensor 1230 (or, in case the sensor 1230 comprises a plurality of sensors, an output signal S for each of the sensors) which encodes the sensed condition is transmitted to the actuator control system 1240. In another embodiment, the actuator control system 1240 can receive fictive sensor values for testing the actuator control system 1240.

Thereby, actuator control system 1240 receives a stream of sensor signals S. It the computes a series of actuator control commands A depending on the stream of sensor signals S, which are then transmitted to actuator 1210.

Actuator control system 1240 receives the stream of sensor signals S of sensor 1230 in an optional receiving unit 1250. Receiving unit 1250 transforms the sensor signals S into input signals x. Alternatively, in case of no receiving unit 1250, each sensor signal S may directly be taken as an input signal x. Input signal x may, for example, be given as an excerpt from sensor signal S. Alternatively, sensor signal S may be processed to yield input signal x. Input signal x may, for example, comprise images, or frames of video recordings. In other words, input signal x is provided in accordance with sensor signal S.

Input signal x is then passed on to an automated learning system 1260, which may, for example, be given by the neural network 100.

Automated learning system 1260 is parametrized by parameters θ, which are stored in and provided by parameter storage P.

Automated learning system 1260 determines output signals y from input signals x. Output signals y are transmitted to a conversion unit 1280, which converts the output signals y into control signals or control commands A. Actuator control commands A are then transmitted to actuator 1210 for controlling actuator 1210 accordingly.

Actuator 1210 receives actuator control commands A, is controlled accordingly and carries out an action corresponding to actuator control commands A. Actuator 1210 may comprise a control logic, which transforms actuator control command A into a further control command, which is then used to control actuator 1210.

In further embodiments, actuator control system 1240 may comprise sensor 1230. The sensor 1230 can be a camera, Radar or Lidar sensor. The sensors are not limited to those, other conceivable sensor as audio sensor are also applicable. In even further embodiments, actuator control system 1240 alternatively or additionally may comprise actuator 1210.

Furthermore, actuator control system 1240 may comprise a processor 45 (or a plurality of processors) and at least one machine-readable storage medium 46 on which instructions are stored which, if carried out, cause actuator control system 1240 to carry out the methods according to one of the previous figures.

Alternatively or additionally to actuator 1210, the embodiment may comprise a display unit 1210*a* which may also be controlled in accordance with actuator control commands A. Alternatively, the display unit 1210*a* belongs to a measurement system, wherein the automated learning system is used to determine a measurement value dependent on the input value.

In a further embodiment of the actuator control system 1240, the actuator control system 1240 comprises a robustness certificate generator 1247. The robustness certificate generator 1247 is configured to generate a robustness certificate corresponding to the method shown in FIG. 8 for example. A generated robustness certificate may be displayed on the display unit 1210*a* or may be used to release the control command A for controlling actuator 1210. In another embodiment the actuator control system 1240 comprise an adversarial example detector 1248 executing the method according to FIG. 8.

In all of the above embodiments, automated learning system 1260 may comprise a classifier that is configured to classify the input signal x belongs to one of several predefined classes. In another embodiment, the automated learning system 1260 is configured to classify an image region or is configured to pixel-wise classify an image.

Additionally or alternatively, the output signal y or the control signal or control command A is displayed on a display unit 1210*a*.

Figure 13:
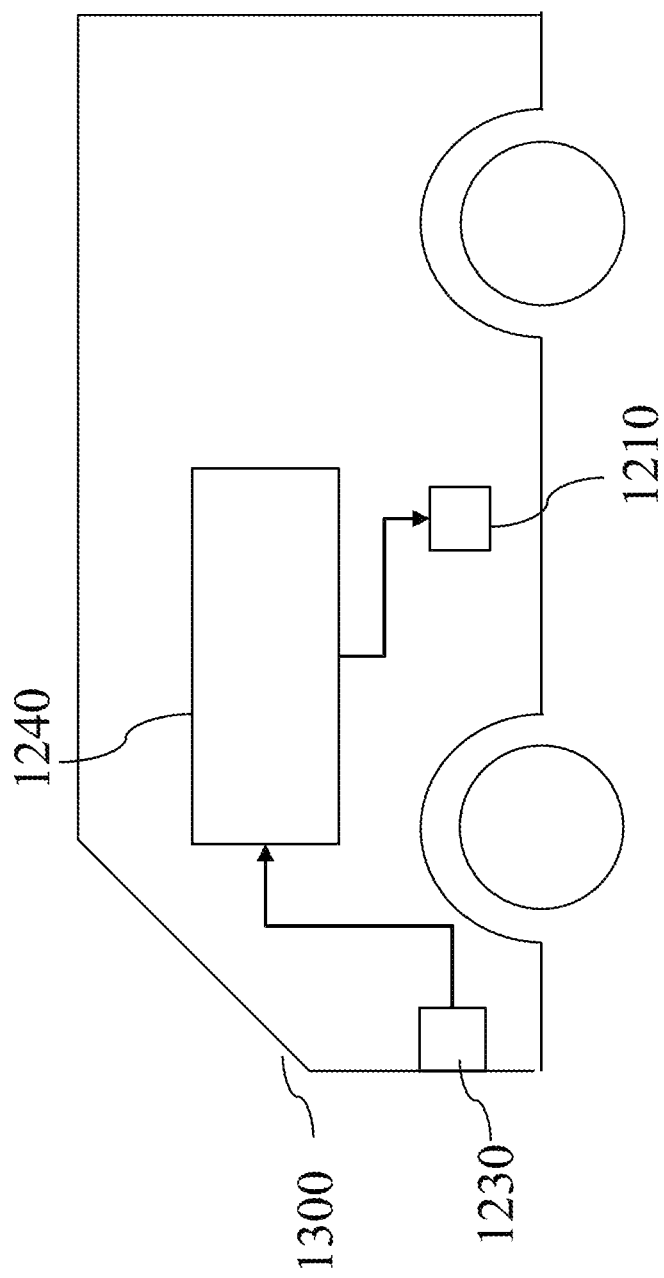
FIG. 13 the actuator control system controlling an partially autonomous robot.

FIG. 13 shows an embodiment in which actuator control system 1240 is used to control an at least partially autonomous robot, e.g. an at least partially autonomous vehicle 1300, dependent on the output value of the automated learning system 1260.

Sensor 1230 may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in vehicle 1300.

Alternatively or additionally sensor 1230 may comprise an information system for determining a state of the actuator system. One example for such an information system is a weather information system, which determines a present or future state of the weather in environment 1220. Further information can be received by communication system or via the internet.

For example, using input signal x, the automated learning system 1260 may for example detect objects in the vicinity of the at least partially autonomous robot. Output signal y may comprise an information that characterizes objects, which are located in the vicinity of the at least partially autonomous robot. Control command A may then be determined in accordance with this information, for example to avoid collisions with said detected objects.

Actuator 1210, which is preferably integrated in vehicle 1300, may be given by a brake, a propulsion system, an engine, a drivetrain, or a steering of vehicle 1300. Actuator control commands A may be determined such that actuator (or actuators) 1210 is/are controlled such that vehicle 1300 avoids collisions with said detected objects. Detected objects may also be classified according to what they automated learning system 1260 deems them most likely to be, e.g. pedestrians or trees, and actuator control commands A may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, actuator command control A may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses sensor 1230, preferably an optical sensor, to determine a state of plants in the environment 1220. Actuator 1210 may be a nozzle for spraying chemicals. Depending on an identified species and/or an identified state of the plants, an actuator control command A may be determined to cause actuator 1210 to spray the plants with a suitable quantity of suitable chemicals.

In even further embodiments, the at least partially autonomous robot may be given by a domestic appliance (not shown), like e.g. a washing machine, a stove, an oven, a microwave, or a dishwasher. Sensor 1230, e.g. an optical sensor, may detect a state of an object, which is to undergo processing by the household appliance. For example, in the case of the domestic appliance being a washing machine, sensor 1230 may detect a state of the laundry inside the washing machine. Actuator control signal A may then be determined depending on a detected material of the laundry.

Figure 14:
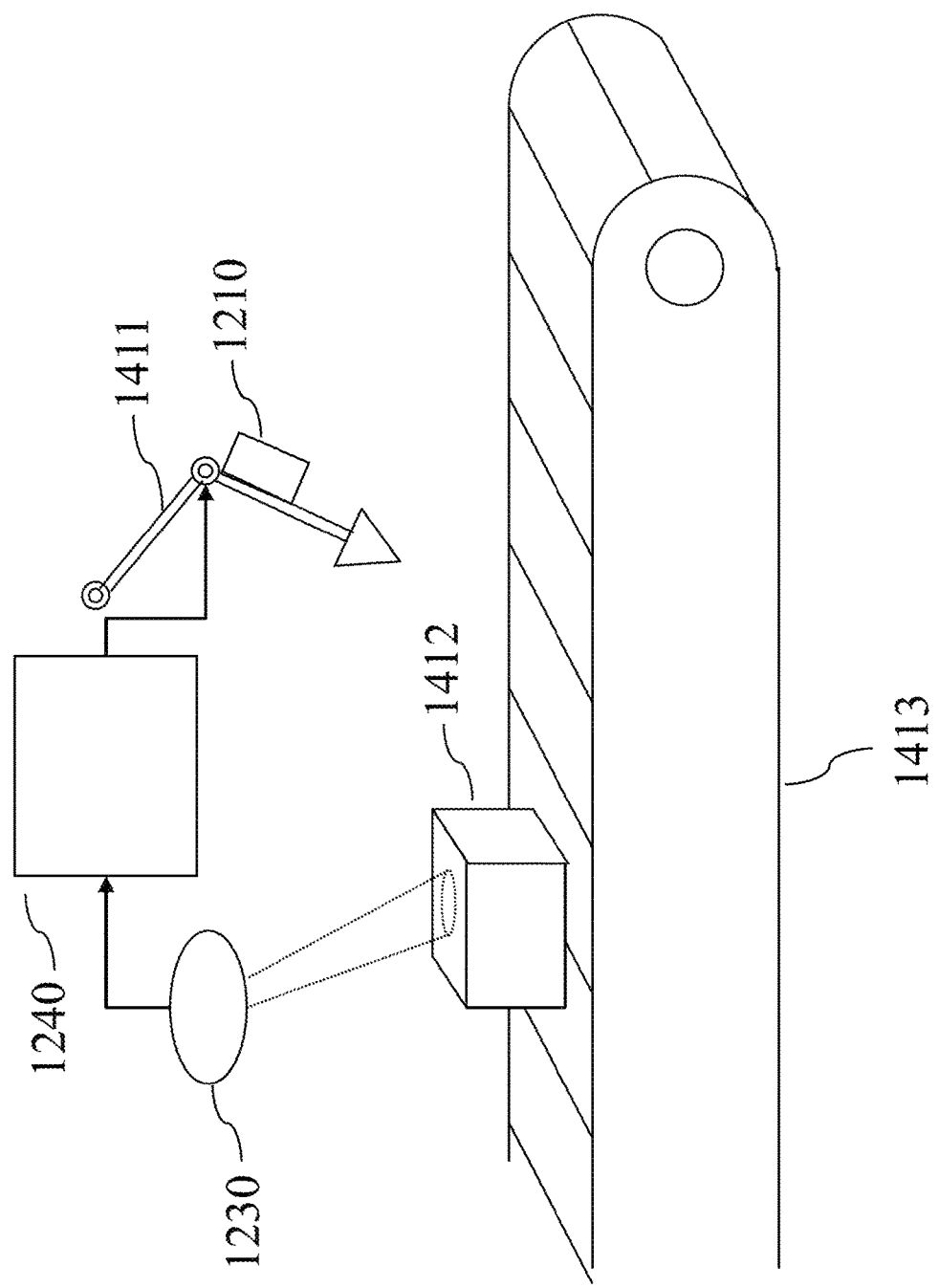
FIG. 14 the actuator control system controlling a manufacturing machine.

Shown in FIG. 14 is an embodiment in which actuator control system 1240 is used to control a manufacturing machine 1411, e.g. a punch cutter, a cutter or a gun drill) of a manufacturing system 200, e.g. as part of a production line. The actuator control system 1240 controls an actuator 1210 which in turn control the manufacturing machine 1413 dependent on the output value of the automated learning system 1260 of of the actuator control system 1240.

Sensor 1230 may be given by an optical sensor, which captures properties of e.g. a manufactured product 1412. Automated learning system 1260 may determine a state of the manufactured product 1412 or the manufactured product 1412 itself from these captured properties. Actuator 1210 which controls manufacturing machine 1411 may then be controlled depending on the determined state of the manufactured product 1412 for a subsequent manufacturing step of manufactured product 1412 determined by the automated learning system 1260 or determined by the actuator control system 1240. Alternatively, it may be envisioned that actuator 1210 is controlled during manufacturing of a subsequent manufactured product 1412 depending on the determined state of the manufactured product 1412.

Figure 15:
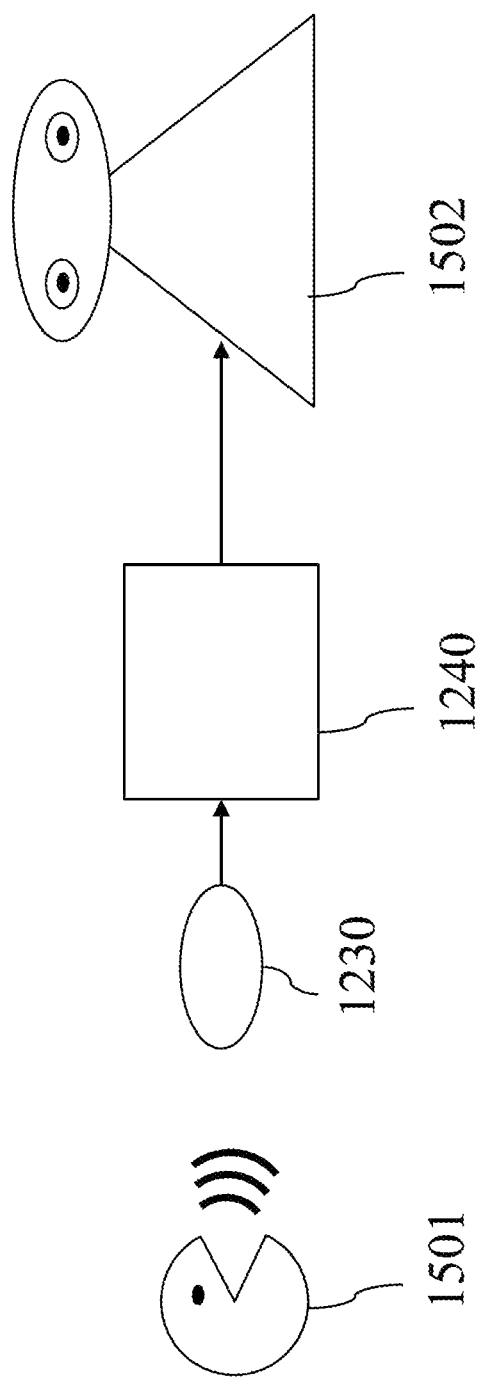
FIG. 15 the actuator control system controlling an automated personal assistant.

Shown in FIG. 15 is an embodiment in which actuator control system 1240 is used for controlling an automated personal assistant 1502. In a preferred embodiment, sensor 1230 may be an acoustic sensor, which receives voice commands of a human user 1501. Sensor 1230 may also comprise an optic sensor, e.g. for receiving video images of a gestures of user 1501.

Actuator control system 1240 then determines actuator control commands A for controlling the automated personal assistant 1502. The actuator control commands A are determined in accordance with sensor signal S of sensor 1230. Sensor signal S is transmitted to the actuator control system 1240. For example, automated learning system 1260 may be configured to e.g. carry out a gesture recognition algorithm to identify a gesture made by user 1501, or it may be configured to carry out a voice command recognition algorithm to identify a spoken command uttered by user 1501. Actuator control system 1240 may then determine an actuator control command A for transmission to the automated personal assistant 1502. It then transmits said actuator control command A to the automated personal assistant 1502.

For example, actuator control command A may be determined in accordance with the identified user gesture or the identified user voice command recognized by automated learning system 1260. It may then comprise information that causes the automated personal assistant 1502 to retrieve information from a database and output this retrieved information in a form suitable for reception by user 1501.

In further embodiments, it may be envisioned that instead of the automated personal assistant 1502, actuator control system 1240 controls a domestic appliance (not shown) controlled in accordance with the identified user gesture or the identified user voice command. The domestic appliance may be a washing machine, a stove, an oven, a microwave or a dishwasher.

Figure 16:
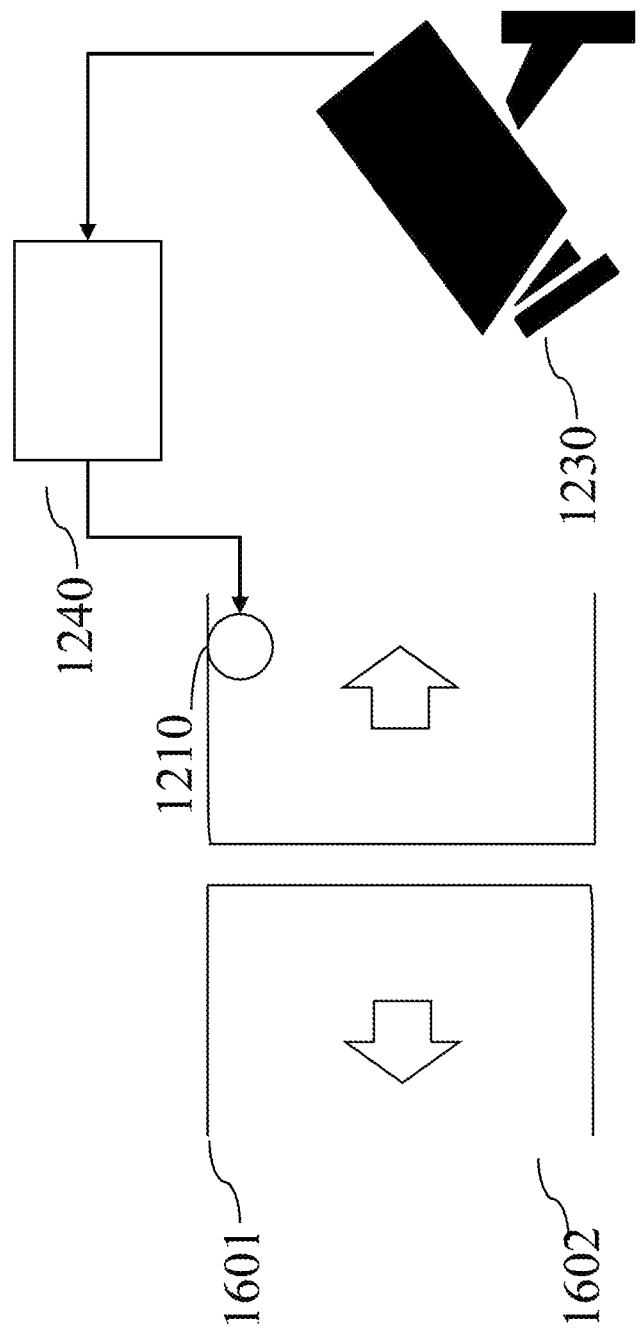
FIG. 16 the actuator control system controlling an access control system.

Shown in FIG. 16 is an embodiment in which actuator control system controls an access control system 1602. Access control system may be designed to physically control access.

It may, for example, comprise a door 1601. Sensor 1230 is configured to detect a scene that is relevant for deciding whether access is to be granted or not. It may for example be an optical sensor for providing image or video data, for detecting a person's face.

Automated learning system 1260 may be configured to interpret this image or video data e.g. by matching identities with known people stored in a database, thereby determining an identity of the person. Actuator control signal A may then be determined depending on the interpretation of automated learning system 1260, e.g. in accordance with the determined identity. Actuator 1210 may be a lock, which grants access or not depending on actuator control signal A. A non-physical, logical access control is also possible. In another embodiment, the actuator control system controls a heating system, wherein the actuator control system is configured to determine the desired climate of the owner dependent on a measured temperature and/or humidity values and optionally dependent on a weather forecast or the daytime.

Figure 17:
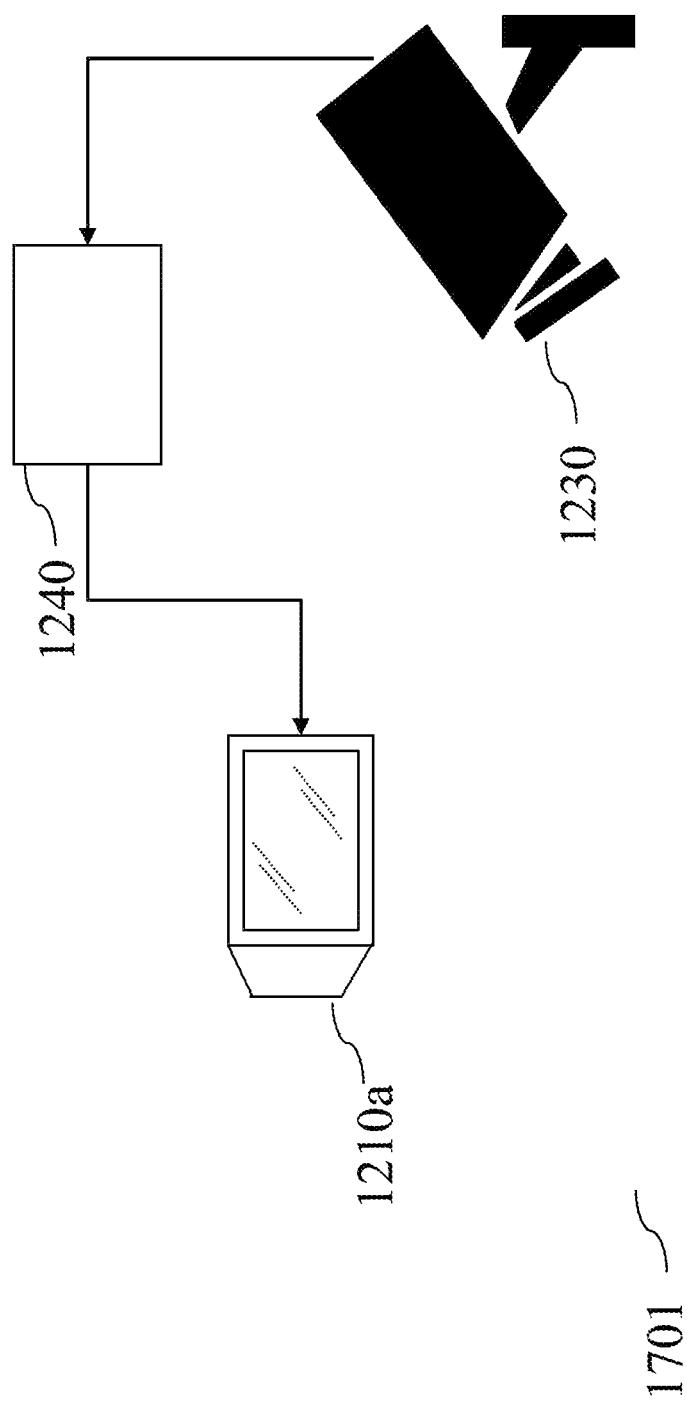
FIG. 17 the actuator control system controlling a surveillance system.

Shown in FIG. 17 is an embodiment in which actuator control system 1240 controls a surveillance system 1701. This embodiment is largely identical to the embodiment shown in FIG. 16. Therefore, only the differing aspects will be described in detail. Sensor 1230 is configured to detect a scene that is under surveillance. Actuator control system does not necessarily control an actuator 1210, but a display 1210*a*. For example, the automated learning system 1260 may determine whether a scene detected by optical sensor 1230 is suspicious. Actuator control signal A which is transmitted to display 1210*a* may then e.g. be configured to cause display 1210*a* to highlight an object that is deemed suspicious by automated learning system 1260.

Figure 18:
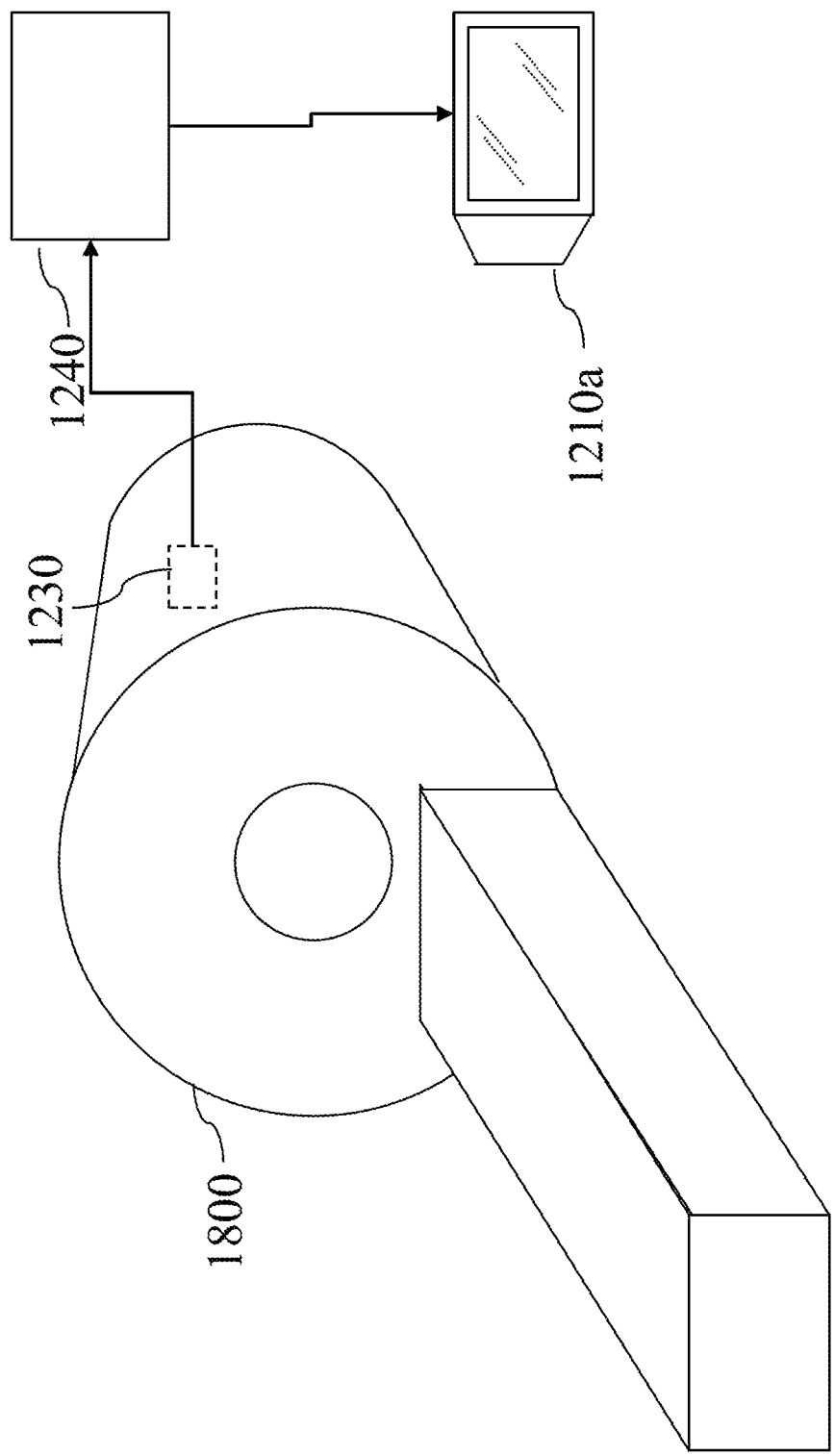
FIG. 18 the actuator control system controlling an, in particular medical, imaging system.

Shown in FIG. 18 is an embodiment of an actuator control system 1240 for controlling an imaging system 1800, for example an MRI apparatus, x-ray imaging apparatus or ultrasonic imaging apparatus. Sensor 1230 may, for example, be an imaging sensor, the sensed image of which is interpreted by automated learning system 1260. Actuator control signal A may then be chosen in accordance with this interpretation, thereby controlling display 1210*a*. For example, automated learning system 1260 may interpret a region of the sensed image to be potentially anomalous. In this case, actuator control signal A may be determined to cause display 1210*a* to display the imaging and highlighting the potentially anomalous region.

Shown in FIG. 19 is an embodiment of a training system 1900 for (re-)training automated learning system 1260, particularly the training system is configured to carry out the method according to FIG. 6. A training data unit 1901 determines input signals x, which are passed on to automated learning system 1260. For example, training data unit 1901 may access a computer-implemented database Q in which a set T of training data is stored. Set T comprises pairs of input signal x and corresponding desired labeled output signal $y^{true}$ Training data unit 1901 selects samples from set T, e.g. randomly.

Input signal x of a selected sample is passed on to automated learning system 1260. Desired output signal $y^{true}$ is passed on to assessment unit 1902.

Automated learning system 1260 is configured to compute output signals y from input signals x. These output signals x are also passed on to assessment unit 1902.

A modification unit 1903 determines updated parameters θ' depending on input from assessment unit 1902. Updated parameters θ' are transmitted to parameter storage P to replace present parameters θ of the automated learning system or adjust the parameters according to the updated parameters θ'.

For example, it may be envisioned that assessment unit 1902 determines the value of the loss functions L depending on output signals y and desired output $y^{true}$. Modification unit 1903 may then compute updated parameters θ' using e.g. stochastic gradient descent to optimize the loss function L Furthermore, training system 1900 may comprise a processor 1904 (or a plurality of processors) and at least one machine-readable storage medium 1905 on which instructions are stored which, if carried out, cause actuator control system 1900 to carry out a method according to one aspect of the disclosure.

Preferably, the processor 1904 comprises at least a Central Processing Unit (CPU), a Graphics Processing Unit (GPU) and/or a Tensor Processing Unit (TPU). Alternatively, the processor 1904 can be partitioned into a distributed computer system, which are connected with each other via a communication system such as the internet. The computer system may comprise backend components, e.g. data sever, and middleware components, e.g. an application/client server and frontend components, e.g. a computer with a graphic interface and/or a sensor like a camera or a sensor network.

What is claimed is:

1. A method for testing a first automated learning system, the first automated learning system being a neural network having (i) an input layer configured to receive a test input value, (ii) hidden layers, and (iii) an output layer configured to output a first output value, the method comprising:
   determining a second output value based on (i) a predefined target output value that is different than a correct output value that is assigned to the test input value and (ii) a reference output value that is one of the correct output value and the first output value of the first automated learning system;
   propagating the second output value through a second automated learning system, the second automated learning system being a neural network having (i) an input layer configured to perform a transformation that is a conjugate of a transformation performed by the output layer of the first automated learning system and being configured to receive the second output value, (ii) hidden layers each corresponding to a respective layer of the hidden layers of the first automated learning system but being arranged in reverse order compared to the corresponding hidden layers of the first automated learning system, each of the hidden layers of the second automated learning system being configured to perform a transformation that is a conjugate of a transformation performed by the corresponding respective layer of the hidden layers of the first automated learning system, and (iii) an output layer configured to perform a transformation that is a conjugate of a transformation performed by the input layer of the first automated learning system and being configured to output a third output value; and
   determining, based on the third output value that results from the propagation of the second output value through the second automated learning system, whether modifications to the test input value cause the output layer of the first automated learning system to output the predefined target output value, the modifications being less than or equal to a predetermined modification magnitude.

2. The method according to claim 1, further comprising:
   issuing a robustness certificate in response to determining that the modifications to the test input value do not cause the output layer of the first automated learning system to output the predefined target output value.

3. The method according to claim 2, the method further comprising:
   controlling a physical actuator of a technical system depending on further output values of the first automated learning system and depending on the issued robustness certificate.

4. The method according to claim 1, further comprising:
   determining an objective function based on (i) the third output value of the second automated learning system, (ii) the modification magnitude, and (iii) the test input value;
   comparing the determined objective function to a predetermined threshold; and
   determining whether the modifications to the test input value cause the output layer of the first automated learning system to output the predefined target output value depending on the result of a comparison.

5. A method for determining a largest modification magnitude of a modification to a test input value to an input layer of a first automated learning system that does not cause an output layer of the first automated learning system to output a predefined target output value that is different than a correct output value that is assigned to the test input value, the first automated learning system being a neural network having (i) the input layer, (ii) hidden layers, and (iii) the output layer, the method comprising:
   determining a second output value based on (i) the predefined target output value and (ii) a reference output value that is one of the correct output value and a first output value of the first automated learning system;
   propagating the second output value through a second automated learning system, the second automated learning system being a neural network having (i) an input layer configured to perform a transformation that is a conjugate of a transformation performed by the output layer of the first automated learning system and being configured to receive the second output value, (ii) hidden layers each corresponding to a respective layer of the hidden layers of the first automated learning system but being arranged in reverse order compared to the corresponding hidden layers of the first automated learning system, each of the hidden layers of the second automated learning system being configured to perform a transformation that is a conjugate of a transformation performed by the corresponding respective layer of the hidden layers of the first automated learning system, and (iii) an output layer configured to perform a transformation that is a conjugate of a transformation performed by the input layer of the first automated learning system and being configured to output a third output value;

determining an objective function based on (i) the test input value, (ii) the third output value that results from the propagation of the second output value through the second automated learning system, and (iii) the modification magnitude; and determining the largest modification magnitude depending on the objective function such that the objective function does not become smaller than a predetermined threshold.

6. The method according to claim 5, wherein the predetermined threshold for the objective function is not less than zero.

7. The method according to claim 5, wherein:
one of a plurality of second output values is determined for each one of a plurality of predefined target output values,
each one of the plurality of predefined target output values corresponds to a differing output value that is different from the reference output value,
the plurality of second output values are propagated through the second automated learning system which outputs a plurality of corresponding output values, and
the objective function is determined depending on said plurality of corresponding output values.

8. The method according to claim 5, further comprising:
detecting whether the test input value of the first automated learning system is anomalous by determining, based on the third output value that results from the propagation of the second output value through the second automated learning system, whether modifications to the test input value cause the output layer of the first automated learning system to output the predefined target output value, the modifications being less than or equal to a predetermined modification magnitude,
wherein the predetermined modification magnitude is selected not to be greater than the largest modification magnitude.

9. A method for training a first automated learning system, the first automated learning system being a neural network having (i) an input layer, (ii) hidden layers, and (iii) an output layer, the method comprising:
providing (i) a predetermined modification magnitude and (ii) training data including both training input values and corresponding training output values;
providing a second automated learning system based on the automated learning system, the second automated learning system being a neural network having (i) an input layer configured to perform a respective second transformation that is a conjugate of a respective first transformation performed by the output layer of the first automated learning system, (ii) hidden layers each corresponding to a respective layer of the hidden layers of the first automated learning system but being arranged in reverse order compared to the corresponding hidden layers of the first automated learning system, each of the hidden layers of the second automated learning system being configured to perform a respective second transformation that is a conjugate of a respective first transformation performed by the corresponding respective layer of the hidden layers of the first automated learning system, and (iii) an output layer configured to perform a respective second transformation that is a conjugate of a respective first transformation performed by the input layer of the first automated learning system;

determining, for each training input value, a corresponding second output value based on (i) a predefined target output value and (ii) the training output value that corresponds to the respective training input value;

propagating the corresponding second output values through the second automated learning system to yield corresponding third output values of the second automated learning system;

determining at least an objective function based on (i) the predetermined modification magnitude, (ii) at least one of the training input values, and (iii) at least one of the corresponding third output values of the second automated learning system;

determining a loss function which depends on the determined objective function and which also depends on at least the training output value which corresponds to the at least one of the training input values; and optimizing the determined loss function by adjusting parameters of the first automated learning system.

10. The method according to claim 9, wherein:
for each training input value, a plurality of corresponding different second output values is determined depending on a plurality of differing output values that are different from the output value which is determined by the first automated learning system depending on the respective training input value,
the plurality of corresponding different second output values of each training input value is fed into the input layer of the second automated learning system and is propagated through the second automated learning system, and
the objective function is determined depending on at least one of the training input values and depending on the output values of the second automated learning system which result from propagating at least one of the plurality of different second output values corresponding to said at least one of the training input value through the second automated learning system.

11. The method according to claim 9, further comprising:
determining a largest modification magnitude of a modification to a test input value to the trained first automated learning system that does not cause the output layer of the first automated learning system to output a predefined target output value that is different than a correct output value that is assigned to the test input value by:
determining the largest modification magnitude depending on the objective function such that the objective function does not become smaller than a predetermined threshold; and
continuing training of the trained first automated learning system if the largest modification magnitude is less than a predetermined second threshold.

12. The method according to claim 9, wherein:
the layers of the first automated learning system are grouped, and
the grouped layers are trained separately from each other.

13. The method according to claim 9, further comprising:
controlling a technical system, wherein the trained first automated learning system receives input data that characterizes a state of the technical system and/or parameters for controlling the technical system and wherein an actuator of the technical system is controlled depending on an output value of the trained first automated learning system.

14. The method according to claim 13, wherein the objective function is determined depending on (i) a first term, which characterizes a product of the output of the second automated learning system multiplied by the input value of the first automated learning system, and (ii) a second term, which characterizes a predetermined norm of the output value of the second automated learning system weighted by the modification magnitude.

15. The method according to claim 14, wherein:
the first term of the objective function is determined depending on a predetermined second norm value of the output of the second automated learning system,
the second norm value is approximated by a random Cauchy projection,
for the approximation, a random Cauchy matrix is propagated through the second automated learning system,
the second norm is determined by determining the median over the output value of the propagated random Cauchy matrix, and
the second term of the objective function is also approximated by the random Cauchy projection.

16. The method according to claim 9, wherein:
each respective layer of the first automated learning system computes an output value depending on the input value of the respective layer using the respective first transformation performed by the respective layer of the first automated learning system,
each respective layer of the second automated learning system calculates an output value depending on the input value of the respective layer using the respective second transformation performed by the respective layer of the second automated learning system,
each respective first transformation of the layers of the first automated learning system is characterized by a respective first function, and
each respective second transformation of the layers of the second automated learning system is characterized by a second function, which is a Fenchel conjugate function of the respective first function of the respective corresponding layer of the first automated learning system.

17. The method according to claim 16, wherein:
an indicator function is defined for each layer of the first automated learning system,
for each layer, the corresponding indicator function is set to zero if the input of the layer is connected to exactly one further layer of the first automated learning system,
the second function is determined depending on the indicator function, and
for each layer, the corresponding indicator function is set to zero if the input of the layer is connected to at least two further layers of the first automated learning system.

18. The method according to claim 17, wherein:
each conjugate function of the respective indicator function is approximated by an upper bound of the conjugate function of the indicator function,
the upper bound is characterized by at least two auxiliary functions,
the first auxiliary function characterizes a value of the upper bound of the conjugate function of the indicator function, and
the second auxiliary function is a predefined constraint for determining the first auxiliary function.

19. The method according to claim 18, wherein determining the objective function further depends on a sum over the first auxiliary functions of the upper bound of the conjugate functions of all layers of the second automated learning system.

20. The method according to claim 9, wherein:
at least one of the layers of the first automated learning system is connected to at least two other layers and receives the output value of the connected layers as its input value,
at least one of the respective first transformations performed by the layers of the first automated learning system is a non-linear function,
at least one of the respective first transformations performed by the layers of the first automated learning system is partly a linear transformation characterized by a parameter,
the input value of at least the layer of the first automated learning system, the transformation of which is the non-linear function, has a limited allowable set of input values, which is characterized by an upper and a lower bound, and
the respective second transformation of the corresponding layer of the second automated learning system, the transformation of which is a ReLu function, is defined as follows:
if the upper bound is smaller than zero, the respective second transformation of the input value is a mapping of each input value to the value zero,
if the lower bound is greater than zero, the respective second transformation of the input value is a linear mapping of each input value on the same value as the input value, and
if the lower and upper bound span over zero, then the respective second transformation is a second linear mapping that weights the input values with a parameter.

21. The method according to claim 20, wherein:
the parameter of the respective second transformation is selected depending on the upper bound and the lower bound,
the linear transformation is given as a multiplication of the input value with a matrix,
the respective second transformation of the linear transformation is characterized by a multiplication of the input value with a transposed matrix of the matrix,
the first automated learning system further comprises a batch normalization layer,
the respective transformation of the batch normalization layer is characterized by a shift of a mean and variance of the input value dependent on a predetermined mean and predetermined variance, and
the respective second transformation of the batch normalization layer is characterized by a division of the input value by the predetermined variance.

22. The method according to claim 20, wherein:
the limited allowable set of input values, is further limited to input values fulfilling a linear inequality, and
the linear inequality is characterized by at least a first parameter and by a second parameter.

23. The method according to claim 22, wherein the first parameter characterizes correlations between elements of the input value of the layer, the respective transformation of which is characterized by the non-linear function.

24. The method according to claim 22, wherein:
the first parameters include a matrix comprising the upper and lower bounds of a previous layer, the matrix is multiplied by a further matrix that characterizes the respective transformation of the previous layer, and the further matrix is a pseudo-inverse of the weight matrix of the previous layer.

25. The method according to claim 22, wherein the second parameter is determined depending on an optimization of a transpose of the matrix multiplied by a vector or matrix that is given by input values of the respective layer subject to predetermined constraints.

26. The method according to claim 9, wherein:

a computer program comprises instructions which, when executed by a computer, cause the computer to carry out the method, and wherein a computer-readable data carrier comprises the computer program.

* * * * *